United States Patent
Hu et al.

(10) Patent No.: US 11,939,218 B2
(45) Date of Patent: Mar. 26, 2024

(54) METHODS AND COMPOSITIONS FOR PRODUCTION OF HYDROGEN AND CARBON NANOMATERIALS BY CATALYTIC METHANE PYROLYSIS USING MICROWAVE-THERMAL HYBRID HEATING

(71) Applicant: West Virginia University Board of Governors on Behalf of West Virginia University, Morgantown, WV (US)

(72) Inventors: Jianli Hu, Morgantown, WV (US); Brandon Robinson, Morgantown, WV (US)

(73) Assignee: West Virginia University Board of Governors on Behalf of West Virginia University, Morgantown, WV (US)

( * ) Notice: Subject to any disclaimer, the term of this patent is extended or adjusted under 35 U.S.C. 154(b) by 0 days.

(21) Appl. No.: 17/823,290

(22) Filed: Aug. 30, 2022

(65) Prior Publication Data
US 2024/0059559 A1 Feb. 22, 2024

Related U.S. Application Data

(60) Provisional application No. 63/399,930, filed on Aug. 22, 2022.

(51) Int. Cl.
*C01B 3/26* (2006.01)
*B01J 6/00* (2006.01)
(Continued)

(52) U.S. Cl.
CPC ........... *C01B 3/26* (2013.01); *B01J 6/008* (2013.01); *B01J 21/185* (2013.01); *B01J 23/892* (2013.01);
(Continued)

(58) Field of Classification Search
CPC ... C01B 3/26; C01B 32/05; C01B 2203/0277; C01B 2203/0855; C01B 2203/1064;
(Continued)

(56) References Cited

U.S. PATENT DOCUMENTS

2008/0173532 A1* 7/2008 Zhu ........................ C01B 3/26
422/89

FOREIGN PATENT DOCUMENTS

EP 3778472 * 2/2021

OTHER PUBLICATIONS

Effects of acidic treatments on the pore and surface properties of Ni catalyst supported on activated carbon Shaobin Wang et al. Carbon, v36 No. 3, pp. 283-292 (Year: 1998).*

(Continued)

*Primary Examiner* — Douglas B Call
(74) *Attorney, Agent, or Firm* — Thomas | Horstemeyer, LLP

(57) ABSTRACT

In one aspect, disclosed herein are devices comprising a disclosed hybrid microwave-thermal chemical reactor device. Also disclosed herein are methods of preparing hydrogen and a crystalline carbon material, such as a carbon nanotube, from methane using a hybrid heating comprising heating with both a thermal fluid and microwave irradiation of a catalyst. This abstract is intended as a scanning tool for purposes of searching in the particular art and is not intended to be limiting of the present disclosure.

18 Claims, 18 Drawing Sheets

(51) Int. Cl.
*B01J 21/18* (2006.01)
*B01J 23/89* (2006.01)
*C01B 32/05* (2017.01)
*H05B 6/64* (2006.01)

(52) U.S. Cl.
CPC ............ *C01B 32/05* (2017.08); *H05B 6/647* (2013.01); *C01B 2203/0277* (2013.01); *C01B 2203/0855* (2013.01); *C01B 2203/1064* (2013.01); *C01B 2203/1082* (2013.01); *C01B 2203/1241* (2013.01)

(58) Field of Classification Search
CPC ...... C01B 2203/1082; C01B 2203/1241; B01J 6/008; B01J 21/185; B01J 23/892; H05B 6/647
USPC .......................................................... 423/445
See application file for complete search history.

(56) References Cited

OTHER PUBLICATIONS

Hydrogen production by methane decomposition: A review Hazzim F. Abbas et al. Int. J. hydrogen energy, v35, pp. 1160-1190 (Year: 2010).*
IEA, "The Future of Hydrogen," Paris, 2019.
B. Parkinson, P. Balcombe, J. F. Speirs, A. D. Hawkes, and K. Hellgardt, "Levelized cost of CO2 mitigation from hydrogen production routes," Energy Environ. Sci., vol. 12, No. 1, pp. 19-40, 2019.
Y. Khojasteh Salkuyeh, B. A. Saville, and H. L. MacLean, "Techno-economic analysis and life cycle assessment of hydrogen production from natural gas using current and emerging technologies," Int. J. Hydrogen Energy, vol. 42, No. 30, pp. 18894-18909, 2017.
L. Alves, V. Pereira, T. Lagarteira, and A. Mendes, "Catalytic methane decomposition to boost the energy transition: Scientific and technological advancements," Renew. Sustain. Energy Rev., vol. 137, p. 110465, 2021.
Z. Fan, W. Weng, J. Zhou, D. Gu, and W. Xiao, "Catalytic decomposition of methane to produce hydrogen: A review," J. Energy Chem., vol. 58, pp. 415-430, 2021.
M. Msheik, S. Rodat, and S. Abanades, "Methane Cracking for Hydrogen Production: A Review of Catalytic and Molten Media Pyrolysis," Energies, vol. 14, No. 11, 2021.
S. Schneider, S. Bajohr, F. Graf, and T. Kolb, "State of the Art of Hydrogen Production via Pyrolysis of Natural Gas," ChemBioEng Rev., vol. 7, No. 5, pp. 150-158, 2020.
Y. Shen and A. C. Lua, "Synthesis of Ni and Ni—Cu supported on carbon nanotubes for hydrogen and carbon production by catalytic decomposition of methane," Appl. Catal. B Environ., vol. 164, pp. 61-69, 2015.
H. F. Abbas and W. M. A. Wan Daud, "Hydrogen production by methane decomposition: A review," Int. J. Hydrogen Energy, vol. 35, No. 3, pp. 1160-1190, 2010.
M. Pudukudy, Z. Yaakob, and Z. S. Akmal, "Direct decomposition of methane over Pd promoted Ni/SBA-15 catalysts," Appl. Surf. Sci., vol. 353, pp. 127-136, 2015.
Y. Li, B. Zhang, X. Xie, J. Liu, Y. Xu, and W. Shen, "Novel Ni catalysts for methane decomposition to hydrogen and carbon nanofibers," J. Catal., vol. 238, No. 2, pp. 412-424, 2006.
J. P. M. Ashik, W. M. A. Wan Daud, and H. F. Abbas, "Production of greenhouse gas free hydrogen by thermocatalytic decomposition of methane—A review," Renew. Sustain. Energy Rev., vol. 44, pp. 221-256, 2015.
D. Ayillath Kutteri, I.-W. Wang, A. Samanta, L. Li, and J. Hu, "Methane decomposition to tip and base grown carbon nanotubes and COx-free H2 over mono- and bimetallic 3d transition metal catalysts," Catal. Sci. Technol., vol. 8, No. 3, pp. 858-869, 2018.
N. Shah, S. Ma, Y. Wang, and G. P. Huffman, "Semi-continuous hydrogen production from catalytic methane decomposition using a fluidized-bed reactor," Int. J. Hydrogen Energy, vol. 32, No. 15, pp. 3315-3319, 2007.
I.-W. Wang et al., "Catalytic decomposition of methane into hydrogen and high-value carbons: combined experimental and DFT computational study," Catal. Sci. Technol., vol. 11, No. 14, pp. 4911-4921, 2021.
M. A. Salam and B. Abdullah, "Catalysis mechanism of Pd-promoted γ-alumina in the thermal decomposition of methane to hydrogen: A density functional theory study," Mater. Chem. Phys., vol. 188, pp. 18-23, 2017.
C. Jiang et al., "Methane Catalytic Pyrolysis by Microwave and Thermal Heating over Carbon Nanotube-Supported Catalysts: Productivity, Kinetics, and Energy Efficiency," Ind. \& Eng. Chem. Res., vol. 61, No. 15, pp. 5080-5092, 2022.
Z. Ye, W. D. Deering, A. Krokhin, and J. A. Roberts, "Microwave absorption by an array of carbon nanotubes: A phenomenological model," Phys. Rev. B, vol. 74, No. 7, p. 75425, Aug. 2006.
M. Xu et al., "Structure sensitivity and its effect on methane turnover and carbon co-product selectivity in thermocatalytic decomposition of methane over supported Ni catalysts," Appl. Catal. A Gen., vol. 611, p. 117967, 2021.
M. Mohiuddin and S. V Hoa, "Temperature dependent electrical conductivity of CNT-PEEK composites," Compos. Sci. Technol., vol. 72, No. 1, pp. 21-27, 2011.
A. Aqel, K. M. M. A. El-Nour, R. A. A. Ammar, and A. Al-Warthan, "Carbon nanotubes, science and technology part (I) structure, synthesis and characterisation," Arab. J. Chem., vol. 5, No. 1, pp. 1-23, 2012.
H. Wang, X. Kou, J. Zhang, and J. Li, "Large scale synthesis and characterization of Ni nanoparticles by solution reduction method," Bull. Mater. Sci., vol. 31, No. 1, pp. 97-100, 2008.
R. Bhaskar, J. Li, and L. Xu, "A Comparative Study of Particle Size Dependency of IR and XRD Methods for Quartz Analysis," Am. Ind. Hyg. Assoc. J., vol. 55, No. 7, pp. 605-609, 1994.
S. A. Hooker, R. Geiss, R. Schilt, and A. Kar, "Rapid Inspection of Carbon Nanotube Quality," Nanostructured Mater. Nanotechnol., pp. 119-130, 2009.
Bokobza, J.-L. Bruneel, and M. Couzi, "Raman Spectra of Carbon-Based Materials (from Graphite to Carbon Black) and of Some Silicone Composites," C, vol. 1, No. 1, pp. 77-94, 2015.
A. Gohier, C. P. Ewels, T. M. Minea, and M. A. Djouadi, "Carbon nanotube growth mechanism switches from tip- to base-growth with decreasing catalyst particle size," Carbon N. Y., vol. 46, No. 10, pp. 1331-1338, 2008.

* cited by examiner

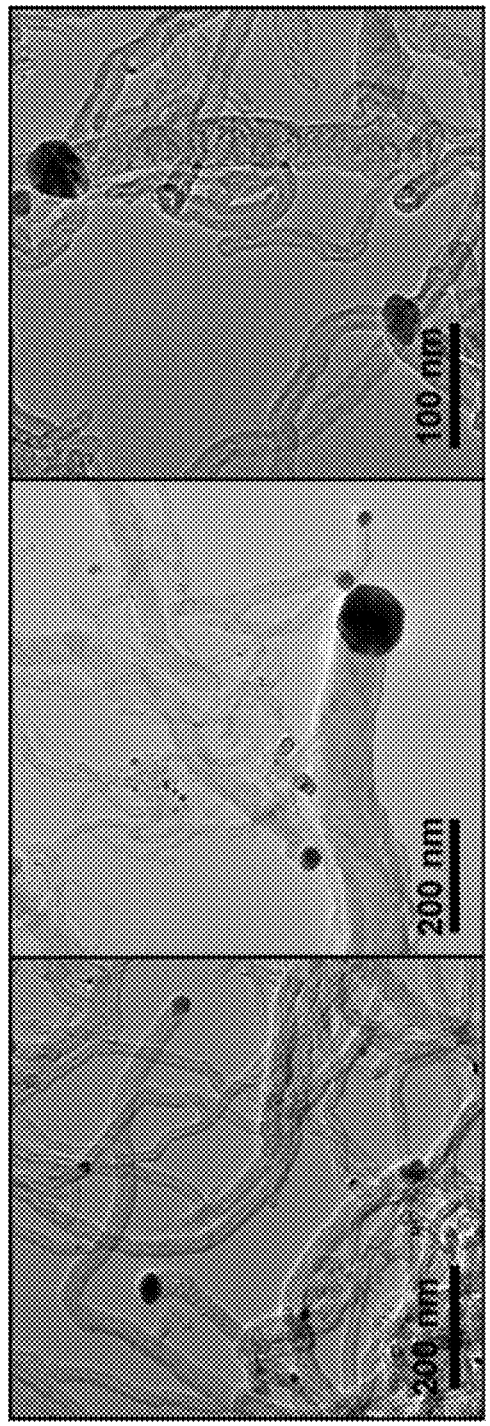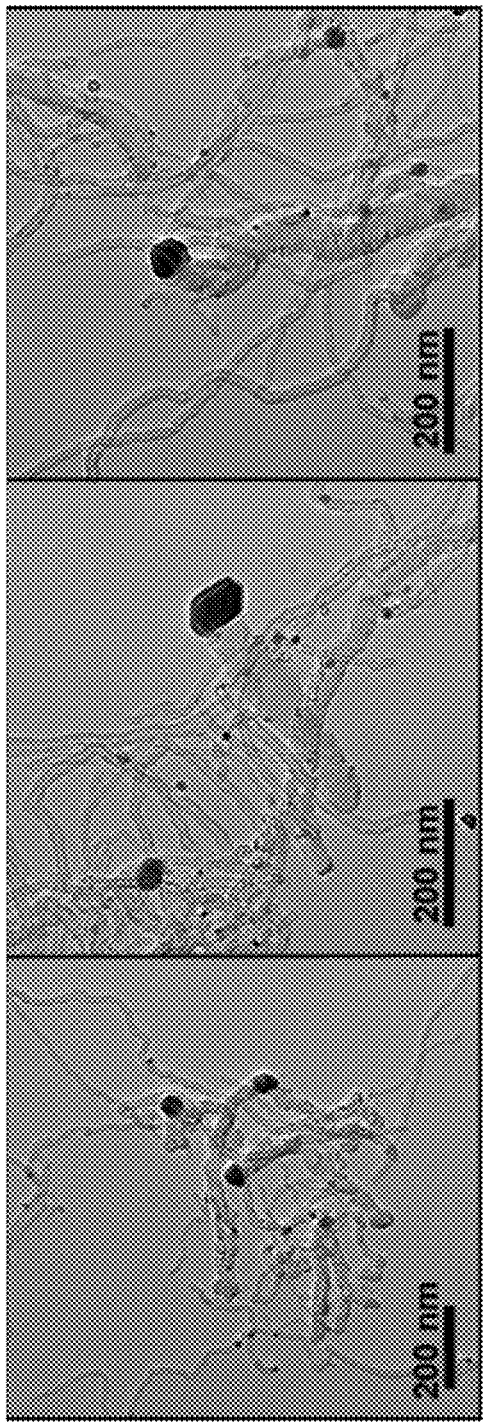

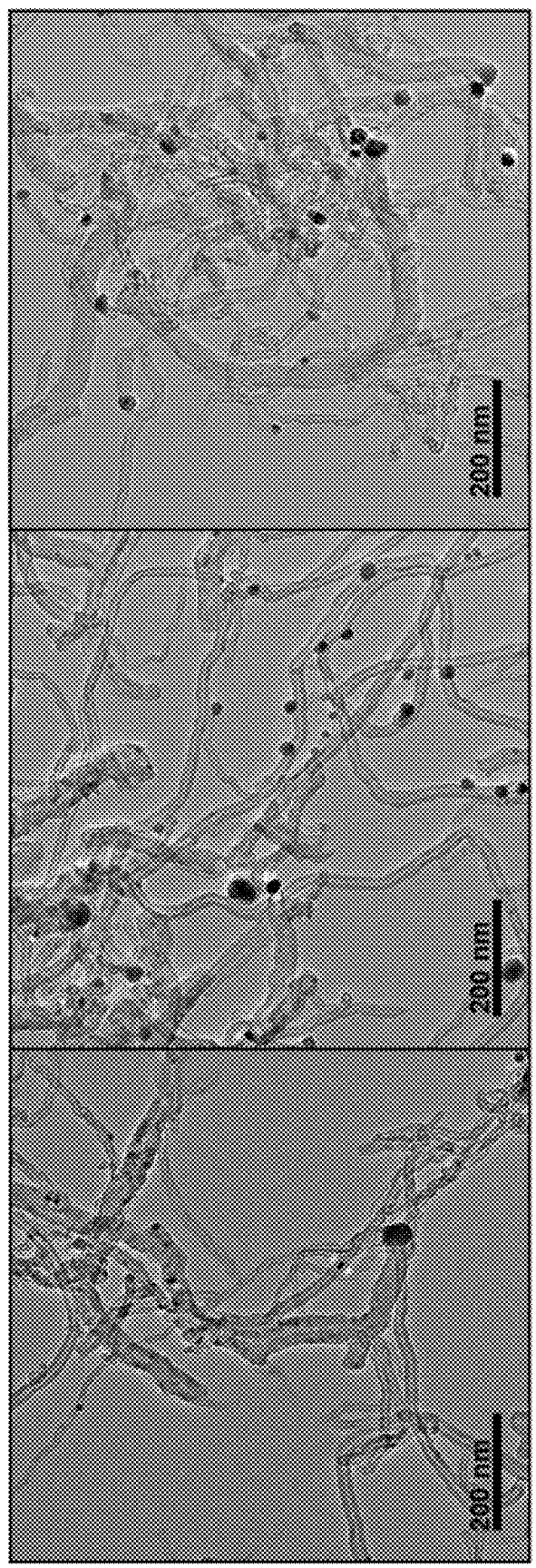

METHODS AND COMPOSITIONS FOR PRODUCTION OF HYDROGEN AND CARBON NANOMATERIALS BY CATALYTIC METHANE PYROLYSIS USING MICROWAVE-THERMAL HYBRID HEATING

CROSS-REFERENCE TO RELATED APPLICATIONS

This application claims the benefit of U.S. Provisional Application No. 63/399,930, filed on Aug. 22, 2022, which is incorporated herein by reference in its entirety.

STATEMENT REGARDING FEDERALLY SPONSORED RESEARCH

This disclosure was made with U.S. Government support under grant number IIP-2016478, awarded by the National Science Foundation (NSF). The U.S. government has certain rights in the disclosure.

BACKGROUND

The combustion of fossil fuels for heat and electricity is currently an essential part of our global society while, at the same time, unmitigated carbon emissions are threatening the population. Hydrogen is a critical alternative energy fuel for supporting a decarbonized world (Ref. 1). Hydrogen production from methane is performed via two main chemical processes, steam reforming (SMR) and pyrolysis. Currently, SMR is the most economically suitable technology for hydrogen production from methane, which accounts for 90% of the global hydrogen supply. However, its disadvantage is the inevitable carbon dioxide production via the water-gas shift reaction (Refs. 2-3). The pairing of carbon capture and sequestration (CC&S) with SMR has the potential to reduce the $CO_2$ emissions, however, at an added cost for CC&S processes. Another disadvantage of SMR is that it requires high operating pressures which significantly increase the high capital costs for building an SMR facility.

Hydrogen produced through methane catalytic pyrolysis (MCP) is one of the promising technological paths for producing $CO_2$-free hydrogen (Refs. 4-7). MCP converts methane over a solid catalyst into hydrogen gas and solid carbon, as show in Equation 1.

$$CH_4 = C_{(solid)} + 2H_2 \quad \text{(Equation 1)}$$

However, the conversion of methane to hydrogen reduces the fuel value by 35%, and the carbon produced from conventional MCP is of low-value carbon black. Conventional MCP industrial processes suffer from low-profit margins and rely heavily on process efficiency and carbon product market value. It is possible to improve the economics and attractiveness of MCP by focusing on creating higher-value carbon products to overcome the economic hurdles associated with conventional MCP applications.

It is believed that carbon nanotubes are a carbon product that could significantly improve the profit margins for MCP industrial processes. Carbon nanotube-producing MCP catalytic enhancements have been focused mainly on metal-support interactions (Refs. 8-12), where metal leaching from the support is a significant issue of catalyst deactivation (Ref. 13). A catalyst selective to base-grown carbon nanotubes prevented metal leaching by leaving the metal attached to the catalyst support and not connected to the carbon nanotube product tip. However, in conventional MCP processes, the separation of CNTs from the catalyst support presents a significant challenge. Mechanical separation by attrition in a fluidized-bed reactor system has been observed to result in a poor separation efficiency of CNTs from the support (Ref. 14).

Despite advances in MCP methods and catalysts used in such methods, there are nevertheless significant economic and process hurdles for widespread adoption of MCP using either SMR or pyrolysis methods. These needs and other needs are satisfied by the present disclosure.

SUMMARY

In accordance with the purpose(s) of the disclosure, as embodied and broadly described herein, the disclosure, in one aspect, relates to a device comprising a disclosed hybrid microwave-thermal chemical reactor device. In a further aspect, the present disclosure relates to methods of preparing hydrogen and a crystalline carbon material, such as a carbon nanotube, from methane using a hybrid heating comprising heating with both a thermal fluid and microwave irradiation of a catalyst.

Disclosed are hybrid microwave-thermal chemical reactor devices comprising a microwave generator; a microwave tuner; a process gas reaction tube disposed within a thermal jacket; a process gas inlet for conveying a process gas into the process gas reaction tube; a process gas outlet for conveying unreacted process gas and reactant gas out from the process gas reaction tube; a thermal gas inlet for conveying a thermal gas in the thermal jacket volume surrounding the process gas reaction tube; a thermal gas outlet for conveying the thermal gas out from the thermal jacket; and wherein the catalyst bed is heated by microwave energy from the microwave generator and heat from the thermal gas; wherein the process gas reaction tube is heated by at least the thermal gas; wherein there is a space between an outer wall of the process gas reaction tube and an inner wall of the thermal jacket, thereby defining a thermal jacket volume surrounding the process gas reaction tube; and wherein the process gas passes over a catalyst bed that is within at least a portion of the process reaction tube.

Also disclosed are devices comprising the disclosed hybrid microwave-thermal chemical reactor device.

Also disclosed are methods for catalytic pyrolysis of methane, the method comprising: (a) conveying a process gas comprising methane to a chemical reactor; wherein the catalyst comprises Ni—Pd, Ni—Cu, Co, Fe, or a combination thereof; (b) heating a catalyst with a thermal fluid and microwave irradiation; (c) contacting a catalyst with the process gas; wherein the methane to undergoes pyrolysis, thereby forming hydrogen and at least one solid carbon product; and (d) collecting the hydrogen.

Also disclosed are methods for catalytic pyrolysis of methane, the method comprising (a) conveying a process gas comprising methane to a chemical reactor; wherein the catalyst comprises Ni—Pd, Ni—Cu, Co, Fe, or a combination thereof; (b) heating a catalyst with a thermal fluid and microwave irradiation; (c) contacting a catalyst with the process gas; wherein the methane to undergoes pyrolysis, thereby forming hydrogen and at least one solid carbon product; and (d) collecting the hydrogen; wherein the method is carried out using a disclosed hybrid microwave-thermal chemical reactor device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE FIGURES

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A shows an illustration of an exemplary hybrid microwave-thermal chemical reactor device. FIG. 1B shows an illustration of an enlarged portion of the exemplary hybrid microwave-thermal chemical reactor device shown in FIG. 1A. FIG. 1C shows an illustration of an exemplary hybrid microwave-thermal chemical reactor device with reference characters or numbers disclosed elements, aspects and/or components as described in greater detail herein below. FIG. 1D shows an illustration of an enlarged portion of the exemplary hybrid microwave-thermal chemical reactor device shown in FIG. 1C.

FIG. 2A shows data for conversion of methane at 650° C. in both a disclosed hybrid heating mode and with microwave heating only. FIG. 2B shows data for conversion of methane at 600° C. in both a disclosed hybrid heating mode and with microwave heating only. FIG. 2C shows data for conversion of methane at 550° C. in both a disclosed hybrid heating mode and with microwave heating only. Temperatures given are those of the catalyst bed temperature, which was monitored using a short-wave infrared Micro-Epsilon pyrometer (Micro-Epsilon USA, Raleigh, North Carolina).

FIG. 3A shows watt per gram catalyst (MW power/g-cat) for both a disclosed hybrid heating mode and with microwave heating only. FIG. 3B shows production of hydrogen per watt microwave power (mg $H_2$/watt) for both a disclosed hybrid heating mode and with microwave heating only.

FIG. 4A shows representative data for catalyst temperature distribution when carried out at using a disclosed hybrid heating mode at 550° C. FIG. 4B shows representative data for catalyst temperature distribution when carried out at using a preheated catalyst set to a temperature of 510° C. FIG. 4C shows representative data for catalyst temperature distribution when carried out at using microwave heating only at 550° C. FIG. 4D shows representative data for catalyst temperature distribution when carried out at using microwave heating only at 650° C. FIG. 4E shows representative data for catalyst temperature distribution when carried out at using a disclosed hybrid heating mode at 600° C. FIG. 4F shows representative data for catalyst temperature distribution when carried out at using microwave heating only at 600° C. FIG. 4G shows representative data for catalyst temperature distribution when carried out at using a disclosed hybrid heating mode at 600° C. Temperatures given are those of the catalyst bed temperature, which was monitored using a short-wave infrared Micro-Epsilon pyrometer (Micro-Epsilon USA, Raleigh, North Carolina).

FIG. 6A shows representative data for CNTs with carbon. FIG. 6B shows representative data for carbon and unreacted catalyst. FIG. 6C shows representative data for CNTs and unreacted catalyst. Temperatures given are those of the catalyst bed temperature, which was monitored using a short-wave infrared Micro-Epsilon pyrometer (Micro-Epsilon USA, Raleigh, North Carolina).

FIG. 7A shows data obtained with microwave heating with the catalyst bed temperature at 550° C. FIG. 7B shows data obtained with a disclosed hybrid heating process with the catalyst bed temperature at 550° C. FIG. 7C shows data obtained with microwave heating with the catalyst bed temperature at 600° C. FIG. 7D shows data obtained with a disclosed hybrid heating process with the catalyst bed temperature at 600° C. FIG. 7E shows data obtained with microwave heating with the catalyst bed temperature at 650° C. FIG. 7F shows data obtained with a disclosed hybrid heating process with the catalyst bed temperature at 650° C. The catalyst bed temperature was monitored using a short-wave infrared Micro-Epsilon pyrometer (Micro-Epsilon USA, Raleigh, North Carolina).

FIG. 9A shows a representative TEM image of bare CNTs. Each of FIGS. 9B-9D each show a representative TEM image of a disclosed Ni—Pd/CNT Catalyst.

FIGS. 12A-12F show representative TEM images of product CNTs. FIGS. 12A and 12D each show a representative TEM image of CNTs produced in the disclosed hybrid heating method at 550° C. FIGS. 12B and 12E each show a representative TEM image of CNTs produced in the disclosed hybrid heating method at 600° C. FIGS. 12C and 12F each show a representative TEM image of CNTs produced in the disclosed hybrid heating method at 650° C.

FIGS. 13A-13C show representative TEM images of product CNTs. FIG. 13A shows a representative TEM image of CNTs produced using microwave only heating at 550° C. FIG. 13B shows a representative TEM image of CNTs produced using microwave only heating at 600° C. FIG. 13C shows a representative TEM image of CNTs produced using microwave only heating at 650° C.

Figure 1B:
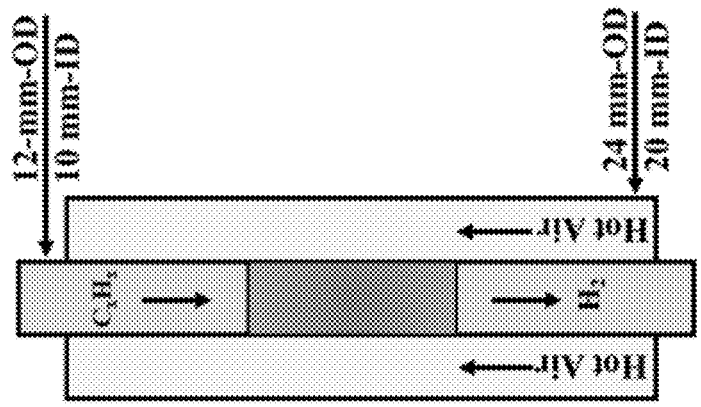
FIGS. 1A-1D show exemplary disclosed hybrid microwave-thermal chemical reactor devices.
Figure 1A:
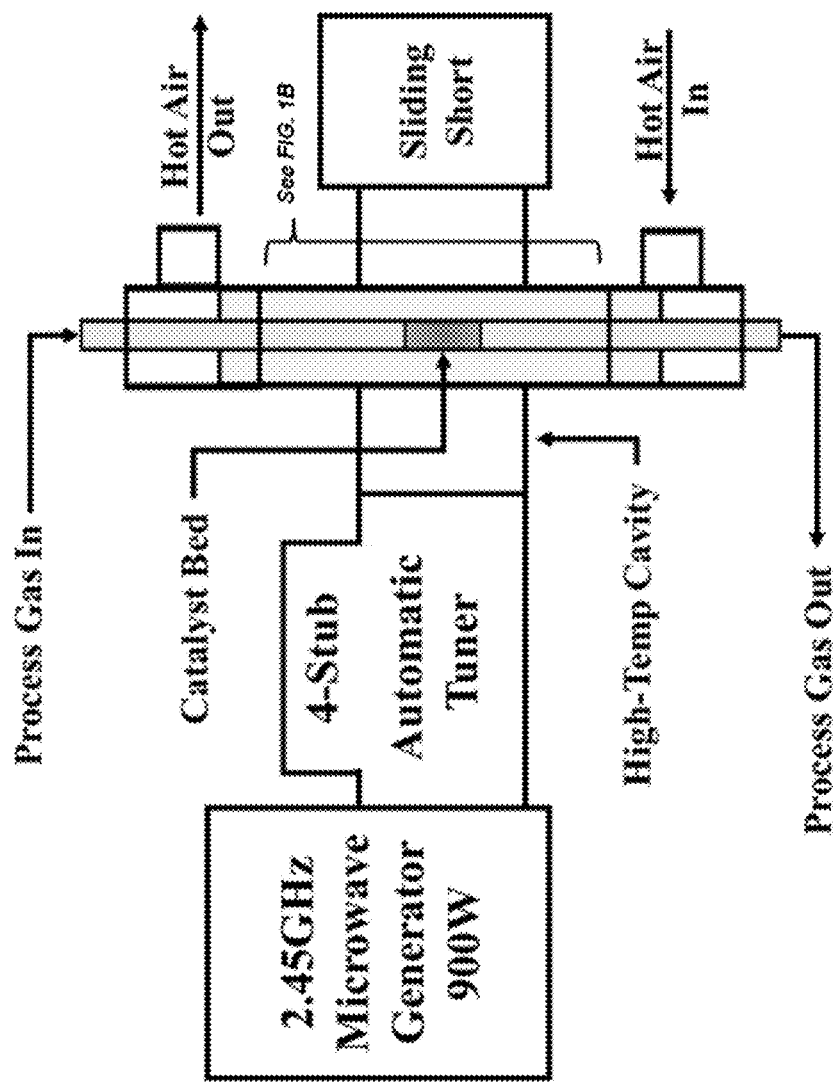

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

A. Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of. It is understood that "consisting essentially of" indicates that an item in the claim is limited to the components specified in the claim and those that do not materially affect the basic and novel characteristic(s) of the claimed aspect or element.

As used in the specification and the appended claims, the singular forms "a," "an" and "the" include plural referents unless the context clearly dictates otherwise. Thus, for example, reference to "a catalyst," "a nanomaterial," or "a nanotube," includes, but is not limited to, two or more such catalysts, nanomaterials, nanotubes, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a catalyst refers to an amount that is sufficient to achieve the desired reaction outcome and/or efficiency. The specific level in terms of wt % in a composition required as an effective amount will depend upon a variety of factors including reaction temperature and pressure, economic considerations, and reactant concentrations and/or amounts.

References in the specification and concluding claims to parts by weight of a particular element or component in a composition or article, denote the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

As used herein the terms "weight percent," "wt %," and "wt %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

As used herein the terms "volume percent," "vol %," and "vol. %," which can be used interchangeably, indicate the percent by volume of a given gas based on the total volume at a given temperature and pressure, unless otherwise specified. That is, unless otherwise specified, all vol % values are based on the total volume of the composition. It should be understood that the sum of vol % values for all components in a disclosed composition or formulation are equal to 100.

As used herein, "carbon nanotubes," unless otherwise specified, refers to collectively to a variety of carbon nanotubes, including helical carbon nanotubes, multi-wall carbon nanotubes, double-wall carbon nanotubes and single-wall carbon nanotubes. It is to be understood that a material or composition referred to as carbon nanotubes can contain, unless otherwise specified, varying proportions of these sub-types of carbon nanotubes. In some aspects, the carbon nanotubes referred to comprise essentially all a particular sub-type, e.g., multi-wall carbon nanotubes.

"Carbon nanomaterials" are carbon-based materials having at least one dimension on the nanometer scale in size (i.e., from 1 to 1000 nm). Carbon nanomaterials can include, but are not limited to, nanoparticles, fullerenes, carbon filaments, single- and multi-walled carbon nanotubes (CNTs), carbon nanofibers (CNFs), and various graphene-based materials.

As used herein, "carbon filaments" include materials such as "carbon nanotubes" and "carbon nanofibers." Carbon filaments are graphite-based and typically have diameters from 0.4 to 500 nm, with lengths in the micrometer-to-millimeter scale range. Carbon nanotubes (CNT) can have single walls or can be multiwalled. CNTs have typically been prepared in the past using laser ablation, arc discharge, and/or chemical vapor deposition methods. In a further aspect, known methods for producing CNTs have drawbacks such as, for example, a requirement for high temperatures (1200-3000° C.) or a requirement to be produced in a vacuum or low pressure process. In an alternative aspect, non-catalytic decomposition of methane at temperatures from about 1000-1100° C. is known to produce amorphous carbon rather than CNTs or other carbon filaments. In one aspect, CNFs may consist of several different forms or layers of carbon. In some aspects, CNFs have properties similar to CNTs but lower tensile strength. In one aspect, CNFs are not hollow, while CNTs are hollow. In one aspect, CNTs and CNFs are used herein as supports for catalysts used in the processes disclosed herein. In another aspect, CNTs and CNFs are also products of the processes disclosed herein. In one aspect, CNTs and/or CNFs have potential applications in sensors including those useful in biomedical applications, electronic devices, lithium-ion batteries, hydrogen storage cells, protection from electrostatic discharge, structural reinforcement in construction and building projects, thin films, increasing the tensile strength of materials, textiles, coatings and films, solar cells, and numerous other related applications.

As used herein, "amorphous carbon" is carbon lacking a crystalline structure. Amorphous carbon is free and usually reactive, although it can be stabilized. In one aspect, the methods and processes disclosed herein can be fine-tuned to favor the production of CNTs and/or CNFs over amorphous carbon. In one aspect, non-catalytic decomposition of methane at high temperatures may produce some amount of amorphous carbon.

"$CO_x$-free" and "$CO_2$" free refer to processes and methods that do not produce measurable amounts of carbon dioxide, carbon monoxide, or related compounds as byproducts. In one aspects, the processes and methods disclosed herein are $CO_x$-free, $CO_2$-free, or both. In a further aspect, $CO_x$-free and $CO_2$-free processes are environmentally-sound as they do not release excess greenhouse gases into the atmosphere.

Compounds are described using standard nomenclature. Unless defined otherwise, technical and scientific terms used herein have the same meaning as is commonly understood by one of skill in the art to which this disclosure belongs. For example, reference to Group 1, Group 2, and other atoms are in reference to IUPAC nomenclature as it applies to the periodic table. In particular, the group nomenclature used herein is that this is in accordance with that put forth in the IUPAC proposal was first circulated in 1985 for public comments (Pure Appl. Chem. IUPAC. 60 (3): 431-436. doi:10.1351/pac198860030431), and was later included as part of the 1990 edition of the Nomenclature of Inorganic Chemistry (Nomenclature of Inorganic Chemistry: Recommendations 1990. Blackwell Science, 1990. ISBN 0-632-02494-1).

The following acronyms are used herein throughout:
CNT Carbon nanotube
MCP Methane catalytic pyrolysis
MWCNT Multi-walled carbon nanotube
TEM Transmission electron microscopy
TGA Oxidative thermogravimetric analysis
XRD X-ray diffraction As used herein, the terms "optional" or "optionally" means that the subsequently described event or circumstance can or cannot occur, and that the description includes instances where said event or circumstance occurs and instances where it does not.

As used herein, "h" is an abbreviation that means "hours".

Unless otherwise specified, temperatures referred to herein are based on atmospheric pressure (i.e. one atmosphere).

B. Reference Numbers

Like reference characters or numbers refer to like elements, aspects and/or components throughout, and explanations that duplicate one another will be omitted. That is, like reference characters or numbers refer to similar components in a device or process similarly configured. The following table, Table 1, provides a list of the various reference characters or numbers used herein throughout along with a short description of the reference character. Further discussion of use, context, construction, and the like for an element, aspect, or component referred to by a reference character is provided herein below. In the drawings, the size and relative sizes of layers and regions may be exaggerated for clarity. Moreover, it is further understood that various modifications and variations can be made to a given reference number referring to a given element, assembly, or component without departing from the scope or spirit of the described element, assembly, or component.

Table 1.
10 Disclosed hybrid thermal heating device
21 Reactant Gases ($C_xH_x$), or Process Gas In
22 Product Gases ($H_2$), or Process Gas Out
31 Input thermal fluid
32 Output thermal fluid—out
33 Thermal fluid flowing within the thermal jacket
41 Input thermal fluid inlet
42 Output thermal fluid outlet
51 Microwave generator
52 Microwave tuner
53 High-temperature cavity
54 Sliding short
61 Catalyst bed
62 Process gas inlet
63 Thermal jacket
64 Process gas outlet
65 Process gas reaction tube
X Thermal jacket diameter 63 (or longest cross-sectional dimension if other than a cylinder)
Y Process gas reaction tube diameter 65 (or longest cross-sectional dimension if other than a cylinder)

C. Disclosed Compositions and Methods

Methane catalytic pyrolysis is a promising solution for producing hydrogen and valuable carbon nanotubes (CNTs) from natural gas without the production of $CO_2$ emissions. Disclosed herein are devices and methods for microwave-enhanced methane catalytic pyrolysis a reactor that allows for microwave heating and combined thermal microwave "hybrid" heating experiments. In the hybrid heating mode, the catalyst can heated to a desired temperature using a thermal fluid, e.g., heated air—such as waste heat—at a temperature from about 150° C. to about 500° C., and then the catalyst temperature can be heated to an operating temperature utilizing microwave irradiation.

In a further aspect, microwave irradiation is used to heat to a catalyst temperature of about 400° C., about 425° C., about 450° C., about 475° C., about 500° C., about 525° C., about 550° C., about 575° C., about 600° C., about 625° C., about 650° C., about 675° C., about 700° C., about 725° C., about 750° C., about 775° C., about 800° C., about 825° C., or about 850° C.; or a range encompassed by an lower and upper limit selected from any of the foregoing values; or any set of values selected from the foregoing values. In a still further aspect, microwave irradiation is used to heat to a catalyst temperature of about 400° C. to about 850° C. In a still further aspect, microwave irradiation is used to heat to a catalyst temperature of about 400° C. to about 850° C. In a yet further aspect, microwave irradiation is used to heat to a catalyst temperature of about 400° C. to about 800° C. In an even further aspect, microwave irradiation is used to heat to a catalyst temperature of about 400° C. to about 750° C. In a still further aspect, microwave irradiation is used to heat to a catalyst temperature of about 400° C. to about 700° C. In a yet further aspect, microwave irradiation is used to heat to a catalyst temperature of about 400° C. to about 650° C. In an even further aspect, microwave irradiation is used to heat to a catalyst temperature of about 400° C. to about 600° C. In a still further aspect, microwave irradiation is used to heat to a catalyst temperature of about 400° C. to about 550° C.

The disclosed hybrid heating devices and methods were found to have a higher methane conversion than microwave heating alone. Without wishing to be bound by a particular theory, it is believed that the higher conversion can be attributed to the more efficient utilization of the catalyst bed and temperature uniformity which is consistent thermal imaging data described in the Examples herein below. Importantly, the disclosed hybrid heating devices and methods were found to have a lower power requirement in order to maintain the reaction temperature, e.g., as discussed in the Examples herein, the power required in the hybrid heating mode was reduced by over 60% of what was initially required under microwave heating only. The disclosed hybrid heating devices and methods were found to yield a more uniform carbon nanotubes compared to microwave heating alone, as discussed in the Examples herein below. The disclosed hybrid heating devices and methods demonstrate the potential of utilizing industrial waste heat to lower the overall size of the microwave generator, increase catalyst utilization, and reduce input energy requirements, thus lowering capital and energy costs.

A Ni—Pd/CNT catalyst was recently disclosed that using cyclic reaction-regeneration experiments and it was further described that an acid treatment method could recover catalyst metals from the tip and base-grown CNTs (Ref. 15). The Ni—Pd/CNT catalyst was regenerated, and a portion of the CNT product was re-applied as the new catalyst support and re-doped with the Ni—Pd dissolved metals. The process was determined to be self-sustained without the need for additional external catalyst metals or CNTs. Density functional theory was also used to understand MCP's fundamental reaction pathways over the Ni—Pd/CNT catalyst (Refs. 15-16).

Microwave heating for heterogeneous catalysis offers advantages over conventional heating systems. For example, microwave heating allows for selective heating, i.e., the heating of materials based on their ability to absorb and convert microwave radiation into heat, and volumetric heating, i.e., elimination of radial heat gradients because the whole volume of the catalyst bed is heated without relying on conduction. Microwave heating of catalysts can provide methane decomposition since the methane and hydrogen gas phase does not appreciably absorb microwaves in their normal state. The effects of microwave heating on MCP and compared it to conventional thermal heating over the Ni—Pd/CNT catalyst were recently described (Ref. 17). The microwave heating mechanism of the catalyst studied combined joule-heating of the CNT support and dielectric heating of the metal nanoparticles (Ref. 18-19). The presence of free electrons in the carbon atoms within the CNT appeared to enable the CNT support to absorb microwave irradiation effectively and turn it into heat energy. These studies further described that the microwave-enhanced MCP showed improvements in kinetics, where the apparent activation energy dropped from 45.5 kJ/mol under conventional heating to 24.8 kJ/mol under microwave irradiation. Process simulation and techno-economic analysis showed that the described method could provide for a possible hydrogen minimum selling price of $1 kg/$H_2$ could be achieved.

Nevertheless, despite these prior descriptions of the use of microwave heating for heterogeneous catalysis, they may still have commercial limitations. In the present disclosure, the performance of a Ni—Pd/CNT catalyst under a hybrid thermal-microwave heating system was found to provide advantages and improvements compared to microwave heating alone. The disclosed hybrid thermal-microwave heating system can alleviate the issues with either thermal or microwave monoheating methods previously described. Without wishing to be bound by a particular theory, it is believed that additional external heat (the thermal heating component of the disclosed hybrid thermal-microwave heating system) can lower the required microwave input energy and increase the catalyst bed temperature homogeneously, thereby improving selectivity and conversion. The disclosed hybrid thermal-microwave heating system and methods demonstrate a remarkable approach to transforming natural gas into clean hydrogen and value-added carbon in a more energy-efficient and economically attractive way than either thermal heating alone or microwave heating alone. In further aspects, the economics and commercial attractiveness of the disclosed hybrid thermal-microwave heating system can be further enhanced by utilizing microwave irradiation in conjunction with industrial waste heat.

In one aspect, the disclosure relates to an device comprising a disclosed hybrid microwave-thermal chemical reactor device. More specifically, in one aspect, the present disclosure relates to disclosed hybrid microwave-thermal chemical reactor devices comprising a microwave generator; a microwave tuner; a process gas reaction tube within a thermal jacket; a process gas inlet conveying a process gas into the process gas reaction tube such that the process gas passes over a catalyst bed that is within at least a portion of the process reaction tube; a process gas outlet conveying unreacted process gas and reactant gas out from the process gas reaction tube; a thermal gas inlet conveying a thermal gas in the thermal jacket volume surrounding the process gas reaction tube; a thermal gas outlet conveying the thermal gas out from the thermal jacket; and wherein the catalyst bed is heated by microwave energy from the microwave generator and heat from the thermal gas; and wherein the process gas reaction tube is heated by at least the thermal gas.

In one aspect, the disclosure relates to a method of catalytic pyrolysis of methane to produce hydrogen and carbon nanomaterials, the method comprising use of a disclosed device comprising a disclosed hybrid microwave-thermal chemical reactor device. In a further aspect, the disclosed method utilizes thermal waste energy from another industrial process that generates excess thermal energy. More specifically, in one aspect, the present disclosure relates to methods for catalytic pyrolysis of methane, the method comprising heating a disclosed catalyst with microwave energy and thermal energy, conveying a disclosed process gas or gases over the catalyst, allowing the process gas or gases to react, thereby former a product gas and a crystalline carbon material. In a further aspect, the method can further comprise pre-heating the catalyst prior to conveying the process gas or gases theron. In a yet further aspect, the method can further comprise recycling the catalyst material. In an even further aspect, the method can further comprise multiple cycles of recycling the catalyst. In a yet further aspect, the method can further comprise recycling the unused process gas or gases for further reaction. In an even further aspect, the method can further comprise multiple cycles of recycling the unused process gas or gases for further reaction.

D. Devices and Device for Hybrid Heating

In one aspect, the disclosure relates to a device comprising a disclosed hybrid microwave-thermal chemical reactor device. More specifically, in one aspect, the present disclosure relates to a disclosed hybrid thermal heating devices comprises a microwave generator; a microwave tuner; a process gas reaction tube within a thermal jacket; a process gas inlet conveying a process gas into the process gas reaction tube such that the process gas passes over a catalyst bed that is within at least a portion of the process reaction tube; a process gas outlet conveying unreacted process gas and reactant gas out from the process gas reaction tube; a thermal gas inlet conveying a thermal gas in the thermal jacket volume surrounding the process gas reaction tube; a thermal gas outlet conveying the thermal gas out from the thermal jacket; and wherein the catalyst bed is heated by microwave energy from the microwave generator and heat from the thermal gas; and wherein the process gas reaction tube is heated by at least the thermal gas. These components and others are listed in Table 1 above, and further described below.

Figure 1D:
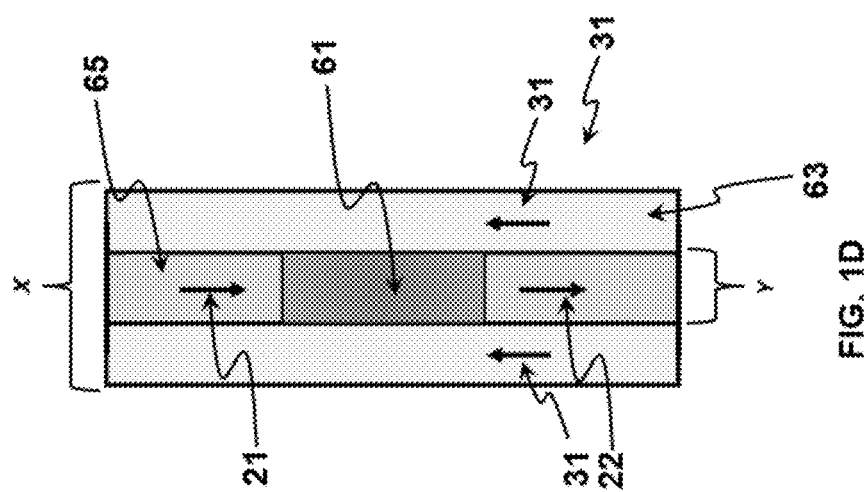
Figure 1C:
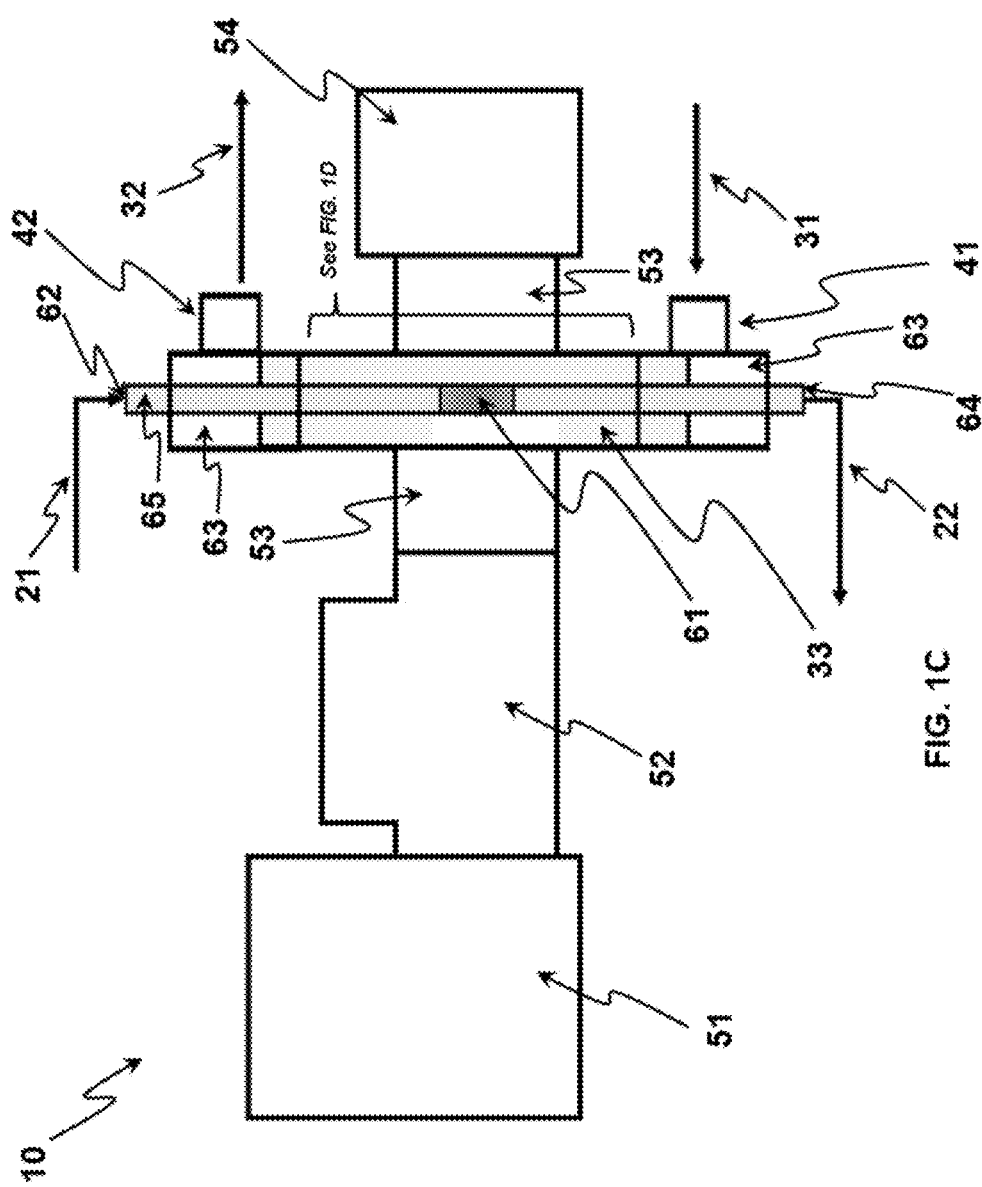

Referring now to FIG. 1C, an exemplary disclosed hybrid microwave-thermal chemical reactor device 10 is shown schematically. The disclosed hybrid microwave-thermal chemical reactor device 10 comprises a process gas inlet 62 that provides an inlet for conveying process reactant gases 21, i.e., methane, to the process gas reaction tube 65 comprising within it a catalyst bed 61 over which the process reactant gases 21 flow and undergo catalytic pyrolysis, thereby forming process gas products 22, i.e., hydrogen, that exit the catalyst bed 61, and ultimately exit via the process gas outlet 64. The process gas reaction tube 65 is within and encompassed by a thermal jacket 63. There is a volume between the thermal jacket 63 and the process gas reaction tube 65, i.e., a volume related to the length of each of the thermal jacket 63 and the process gas reaction tube 65 and a space separating an inner wall of the thermal jacket 63 and an outer wall of the process gas reaction tube 65. An input thermal fluid 31 flows from outside of the thermal jacket 63 via a thermal gas inlet 41 into the volume between the thermal jacket 63 and the process gas reaction tube 65. The thermal fluid 33 within the volume between the thermal jacket 63 and the process gas reaction tube 65 flows around the process gas reaction tube 65, exiting via a thermal fluid outlet 42 as output thermal fluid 32. The output thermal fluid 32 can have less thermal energy than the input thermal fluid 31 due to transfer of thermal energy within the thermal jacket 63, particularly to the catalyst bed 61. FIG. 1D shows an enlarged view of the region indicated in FIG. 1C.

The disclosed hybrid microwave-thermal chemical reactor device 10 further comprises a microwave generator 51, a microwave tuner 52, a high temperature cavity 53, and a microwave sliding short 54. The high temperature cavity 53 can be located such that is surrounds the thermal jacket 63 at an axial position that covers, at least in part, the catalyst bed 61.

In FIG. 1D, the various flows are depicted, e.g., thermal fluid, process gas reactant, and process gas product. Moreover, the space which defines the overall volume through which the thermal fluid 33 can occupy around the process gas reaction tube 65 is the difference between X, the diameter of the thermal jacket 63 (or longest cross-sectional dimension if the thermal jacket 63 is other than a cylindrical), and Y, the diameter of the process gas reaction tube 65 (or longest cross-sectional dimension if the process gas reaction tube 65 is other than a cylindrical).

In various aspects, the input thermal fluid 31 can be steam, heated air (including superheated air), or heated water. In a still further aspect, the input thermal fluid 31 is a waste thermal fluid that is utilized in the disclosed hybrid microwave-thermal chemical reactor device prior to cooling or discharge. In a yet further aspect, the waste thermal fluid can be a cooling liquid from an electrical generation facility such as a power plant wherein the power plant utilizes coal, hydrogen, or gas as an energy source and comprises various cooling components. In an even further aspect, the waste thermal fluid can be a cooling liquid from a nuclear power plant. In a still further aspect, the waste thermal fluid can be an thermal fluid arising from a manufacturing or industrial process, which typically is discharged or recirculated after cooling.

In various aspects, the catalyst bed 61 comprises a disclosed catalyst composition, such as the Ni/Pd/CNT catalyst as disclosed in the Examples.

In a further aspect, the process gas reaction tube 65 comprising the catalyst bed 61 further is configured as a fixed bed reactor. In a still further aspect, the process gas reaction tube 65 comprising the catalyst bed 61 further is configured as a moving bed reactor.

E. Catalyst Compositions

In one aspect, the catalytic materials useful herein have dielectric properties that allow microwave absorption, especially at higher temperatures. In a further aspect, the catalysts can be designed to interact with microwaves through other mechanisms. In one aspect, a metal dopant such as, for example, iron, can be added to catalytic sites for magnetic coupling. In one aspect, a ferromagnetic species can couple with the magnetic component of the microwave field, adding energy to the reaction. In a further aspect, coupling of the microwave field with polar intermediate species on the surface of the catalyst can increase the amount of energy available for the reaction.

In a further aspect, the catalyst compositions used in the disclosed processes and/or with the disclosed devices can be catalyst comprising Ni—Pd, Ni—Cu, Co, Fe, or combinations thereof. In a still further aspect, the disclosed catalyst comprising Ni—Pd, Ni—Cu, Co, Fe, or combinations thereof can be an unsupported catalyst. In yet further aspect, Ni—Pd, Ni—Cu, Co, Fe, or combinations thereof can be a supported catalyst. In an even further aspect, the support catalyst can be supported on a carbon nanotube or carbon crystalline material such as a disclosed carbon nanotube or carbon crystalline material formed in the disclosed processes and/or with the disclosed devices.

In a further aspect, the catalyst composition is a Ni—Pd catalyst composition comprising a ratio of Ni:Pd of about 5:1 to about 30:1. In a still further aspect, the catalyst composition is a Ni—Pd catalyst composition comprising a ratio of Ni:Pd of about 7.5:1 to about 30:1. In a yet further aspect, the catalyst composition is a Ni—Pd catalyst composition comprising a ratio of Ni:Pd of about 10:1 to about 30:1. In an even further aspect, the catalyst composition is a Ni—Pd catalyst composition comprising a ratio of Ni:Pd of about 5:1 to about 20:1. In a still further aspect, the catalyst composition is a Ni—Pd catalyst composition comprising a ratio of Ni:Pd of about 7.5:1 to about 20:1. In a yet further aspect, the catalyst composition is a Ni—Pd catalyst composition comprising a ratio of Ni:Pd of about 10:1 to about 20:1. In an even further aspect, the catalyst composition is a Ni—Pd catalyst composition comprising a ratio of Ni:Pd of about 5:1 to about 15:1. In a still further aspect, the catalyst composition is a Ni—Pd catalyst composition comprising a ratio of Ni:Pd of about 7.5:1 to about 15:1. In a yet further aspect, the catalyst composition is a Ni—Pd catalyst composition comprising a ratio of Ni:Pd of about 10:1 to about 15:1. In an even further aspect, the catalyst composition is a Ni—Pd catalyst composition comprising a ratio of Ni:Pd of about 5:1 to about 12.5:1. In a still further aspect, the catalyst composition is a Ni—Pd catalyst composition comprising a ratio of Ni:Pd of about 7.5:1 to about 12.5:1. In a yet further aspect, the catalyst composition is a Ni—Pd catalyst composition comprising a ratio of Ni:Pd of about 10:1 to about 12.5:1.

In some aspects, different metal ratios (by weight) can be used in the supported and/or unsupported catalysts disclosed herein. In a further aspect, altering the ratio of metals (such as, for example, Ni and Pd) can alter the catalytic performance of the system. In one aspect, pure Ni can be used as catalyst. In another aspect, pure Pd can be used as catalyst. In still another aspect, a different metal can be used as catalyst. In one aspect, the ratio of Ni to Pd can be 20:1, 15:1, 10:1, 5:1, 1:1, or another ratio, or a combination of any of the foregoing values, or a range encompassing any of the foregoing values. In one aspect, the ratio of Ni to Pd is 10:1. In another aspect, the ratio of Ni to Pd is 5:1. Without wishing to be bound by theory, it is believed the metals in the solid solution of Ni and Pd have synergistic catalytic effects that are only achieved when a minimum concentration of Pd is present.

In a further aspect, the catalyst composition is a Ni—Pd catalyst composition comprising about 5 wt % to about 30 wt % Ni and about 0.1 wt % to about 5 wt % Pd. In a still further aspect, the catalyst composition is a Ni—Pd catalyst composition comprising about 5 wt % to about 15 wt % Ni and about 0.5 wt % to about 2.5 wt % Pd. In a yet further aspect, the catalyst composition is a Ni—Pd catalyst composition comprising about 7.5 wt % to about 12.5 wt % Ni and about 0.75 wt % to about 1.5 wt % Pd.

In a further aspect, the catalyst composition is a Ni—Pd catalyst composition comprising about 5 wt % to about 30 wt % Ni, about 0.1 wt % to about 5 wt % Pd, and about 70 wt % to about 95 wt % of a catalyst support. In a still further aspect, the catalyst composition is a Ni—Pd catalyst composition comprising about 5 wt % to about 15 wt % Ni, about 0.5 wt % to about 2.5 wt % Pd, and about 82.5 wt % to about 95.5 wt % of a catalyst support. In a yet further aspect, the catalyst composition is a Ni—Pd catalyst composition comprising about 7.5 wt % to about 12.5 wt % Ni, about 0.75 wt % to about 1.5 wt % Pd, and about 83.5 wt % to about 92 wt % of a catalyst support.

In a further aspect, the catalyst composition is a Ni—Pd catalyst composition comprising about 5 wt % to about 30 wt % Ni, about 0.1 wt % to about 5 wt % Pd, and about 70 wt % to about 95 wt % of a catalyst support, wherein the catalyst support is a carbon nanotube and/or a crystalline carbon material. In a still further aspect, the catalyst composition is a Ni—Pd catalyst composition comprising about 5 wt % to about 15 wt % Ni, about 0.5 wt % to about 2.5 wt % Pd, and about 82.5 wt % to about 95.5 wt % of a catalyst support, wherein the catalyst support is a carbon nanotube and/or a crystalline carbon material. In a yet further aspect, the catalyst composition is a Ni—Pd catalyst composition comprising about 7.5 wt % to about 12.5 wt % Ni, about 0.75 wt % to about 1.5 wt % Pd, and about 83.5 wt % to about 92 wt % of a catalyst support, wherein the catalyst support is a carbon nanotube and/or a crystalline carbon material.

In a further aspect, the catalyst composition is a Ni—Cu catalyst composition comprising a ratio of Ni:Cu of about 5:1 to about 30:1. In a still further aspect, the catalyst composition is a Ni—Cu catalyst composition comprising a ratio of Ni:Cu of about 7.5:1 to about 30:1. In a yet further aspect, the catalyst composition is a Ni—Cu catalyst composition comprising a ratio of Ni:Cu of about 10:1 to about 30:1. In an even further aspect, the catalyst composition is a Ni—Cu catalyst composition comprising a ratio of Ni:Cu of about 5:1 to about 20:1. In a still further aspect, the catalyst composition is a Ni—Cu catalyst composition comprising a ratio of Ni:Cu of about 7.5:1 to about 20:1. In a yet further aspect, the catalyst composition is a Ni—Cu catalyst composition comprising a ratio of Ni:Cu of about 10:1 to about 20:1. In an even further aspect, the catalyst composition is a Ni—Cu catalyst composition comprising a ratio of Ni:Cu of about 5:1 to about 15:1. In a still further aspect, the catalyst composition is a Ni—Cu catalyst composition comprising a ratio of Ni:Cu of about 7.5:1 to about 15:1. In a yet further aspect, the catalyst composition is a Ni—Cu catalyst composition comprising a ratio of Ni:Cu of about 10:1 to about 15:1. In an even further aspect, the catalyst composition is a Ni—Cu catalyst composition comprising a ratio of Ni:Cu of about 5:1 to about 12.5:1. In a still further aspect, the catalyst composition is a Ni—Cu catalyst composition comprising a ratio of Ni:Cu of about 7.5:1 to about 12.5:1. In a yet further aspect, the catalyst composition is a Ni—Cu catalyst composition comprising a ratio of Ni:Cu of about 10:1 to about 12.5:1.

In a further aspect, the catalyst composition is a Ni—Cu catalyst composition comprising about 5 wt % to about 30 wt % Ni and about 0.1 wt % to about 5 wt % Cu. In a still further aspect, the catalyst composition is a Ni—Cu catalyst composition comprising about 5 wt % to about 15 wt % Ni and about 0.5 wt % to about 2.5 wt % Cu. In a yet further aspect, the catalyst composition is a Ni—Pd catalyst composition comprising about 7.5 wt % to about 12.5 wt % Ni and about 0.75 wt % to about 1.5 wt % Cu.

In a further aspect, the catalyst composition is a Ni—Cu catalyst composition comprising about 5 wt % to about 30 wt % Ni, about 0.1 wt % to about 5 wt % Cu, and about 70 wt % to about 95 wt % of a catalyst support. In a still further aspect, the catalyst composition is a Ni—Cu catalyst composition comprising about 5 wt % to about 15 wt % Ni, about 0.5 wt % to about 2.5 wt % Cu, and about 82.5 wt % to about 95.5 wt % of a catalyst support. In a yet further aspect, the catalyst composition is a Ni—Cu catalyst composition comprising about 7.5 wt % to about 12.5 wt % Ni, about 0.75 wt % to about 1.5 wt % Cu, and about 83.5 wt % to about 92 wt % of a catalyst support.

In a further aspect, the catalyst composition is a Ni—Cu catalyst composition comprising about 5 wt % to about 30 wt % Ni, about 0.1 wt % to about 5 wt % Cu, and about 70 wt % to about 95 wt % of a catalyst support, wherein the catalyst support is a carbon nanotube and/or a crystalline carbon material. In a still further aspect, the catalyst composition is a Ni—Cu catalyst composition comprising about 5 wt % to about 15 wt % Ni, about 0.5 wt % to about 2.5 wt % Cu, and about 82.5 wt % to about 95.5 wt % of a catalyst support, wherein the catalyst support is a carbon nanotube and/or a crystalline carbon material. In a yet further aspect, the catalyst composition is a Ni—Cu catalyst composition comprising about 7.5 wt % to about 12.5 wt % Ni, about 0.75 wt % to about 1.5 wt % Cu, and about 83.5 wt % to about 92 wt % of a catalyst support, wherein the catalyst support is a carbon nanotube and/or a crystalline carbon material.

In one aspect, the catalyst can be supported by an aerogel. In a further aspect, the aerogel can be an $Al_2O_3$ aerogel. In one aspect, when the catalyst is an aerogel, the catalyst can be a Ni—Pd catalyst, wherein the ratio of Ni:Pd:support is from about 8:1:91 to about 12:1:87, or is about 8:1:91, 9:1:90, 10:1:89, 11:1:88, or about 12:1:87, or a combination of any of the foregoing values, or a range encompassing any of the foregoing values. In one aspect, the ratio of Ni:Pd:support is about 10:1:89.

In another aspect, the catalyst can be supported by crystalline forms of carbon generated by the processes disclosed herein, SiC, $SiO_2$, $Al_2O_3$, $TiO_2$, $ZrO_2$, or a combination thereof. In one aspect, when the support is a crystalline form of carbon, the support can be selected from nanoparticles, fullerenes, carbon filaments, single-walled carbon nanotubes, multi-walled carbon nanotubes, carbon nanofibers, or a combination thereof.

In some aspects, the catalysts, whether supported or unsupported, can be bimetallic. In one aspect, the bimetallic catalyst can be a Ni—Pd catalyst. In another aspect, the Ni—Pd catalyst can be doped by an alkali metal, an alkaline earth metal, or a transition metal including, but not limited to, Fe, Li, Na, K, Cs, Mg, Ca, Ba, or a combination thereof. In one aspect, the addition of an alkali metal, alkaline earth metal, or transition metal can promote catalyst structure, modify active metal dispersion, and/or promote hydrogen spillover. In other aspects, the catalysts can be trimetallic.

In some aspects, different metal ratios (by weight) can be used in the supported and/or unsupported catalysts disclosed herein. In a further aspect, altering the ratio of metals (such as, for example, Ni and Pd) can alter the catalytic performance of the system. In one aspect, pure Ni can be used as catalyst. In another aspect, pure Pd can be used as catalyst. In still another aspect, a different metal can be used as catalyst. In one aspect, the ratio of Ni to Pd can be 20:1, 15:1, 10:1, 5:1, 1:1, or another ratio, or a combination of any of the foregoing values, or a range encompassing any of the foregoing values. In one aspect, the ratio of Ni to Pd is 10:1. In another aspect, the ratio of Ni to Pd is 5:1. Without wishing to be bound by theory, it is believed the metals in the solid solution of Ni and Pd have synergistic catalytic effects that are only achieved when a minimum concentration of Pd is present.

In one aspect, different catalyst metal compositions may have different average particle sizes that can be determined by examination with an electron microscope. In one aspect, for a Ni/CNT catalyst, round metal particles with an average diameter from about 50 to about 100 nm, or about 50, 60, 70, 80, 90, or about 100 nm are observed. In another aspect, for an unsupported Ni catalyst, large agglomerates with diameters of hundreds of nm (with some upwards of 500 nm) are observed. In another aspect, for a Pd/CNT catalyst, the average metal particle size is about 5 nm. In one aspect, with increased amounts of Ni versus Pd in unsupported catalysts, more agglomeration is observed. In one aspect, the same effects may not be observed for CNT-supported catalysts. Without wishing to be bound by theory, the presence of CNT or other supports may aid in distribution of the metal catalyst particles such that agglomeration does not occur. In any of the above aspects, catalyst particles with average diameters on the order of about 50 to about 100 nm that do not agglomerate may be the most effective at enabling and/or enhancing the disclosed processes. In any of the above aspects, agglomeration may be associated with sintering behavior (i.e., coalescence into a solid mass). In one aspect, catalysts that resist sintering may be particularly effective at enabling and/or enhancing the disclosed processes.

F. Methods for Catalytic Pyrolysis of Methane Using Hybrid Heating

In one aspect, the present disclosure relates to a method of catalytic pyrolysis of methane to produce hydrogen and carbon nanomaterials, the method comprising use of a disclosed device comprising a disclosed hybrid microwave-thermal chemical reactor device.

In a further aspect, the present disclosure relates to a method of catalytic pyrolysis of methane to produce hydrogen and carbon nanomaterials, the method comprising use of a disclosed device comprising a disclosed hybrid microwave-thermal chemical reactor device. In a further aspect, the disclosed method utilizes thermal waste energy from another industrial process that generates excess thermal energy. More specifically, in one aspect, the present disclosure relates to methods for catalytic pyrolysis of methane, the method comprising heating a disclosed catalyst with microwave energy and thermal energy, e.g., a thermal fluid, conveying a disclosed process gas or gases over the catalyst, allowing the process gas or gases to react, thereby former a product gas and a crystalline carbon material. In a further aspect, the method can further comprise pre-heating the catalyst prior to conveying the process gas or gases theron. In a yet further aspect, the method can further comprise recycling the catalyst material. In an even further aspect, the method can further comprise multiple cycles of recycling the catalyst. In a yet further aspect, the method can further comprise recycling the unused process gas or gases for further reaction. In an even further aspect, the method can further comprise multiple cycles of recycling the unused process gas or gases for further reaction.

In a further aspect, the reaction proceeds according to the following general scheme:

$$CH_4 \rightarrow C_{(CNT,CNF)} + 2H_2$$

In a further aspect, the disclosed method utilizes thermal waste energy from another industrial process that generates excess thermal energy.

Also disclosed are methods for catalytic pyrolysis of methane, the disclosed method is carried out using a disclosed hybrid microwave-thermal chemical reactor device.

Without wishing to be bound by theory, the disclosed methods make use of a hybrid heating process comprising both thermal heating and microwave heating of a catalyst. The microwave heating of the catalyst makes use of selective bond activation, and the interface between reactant and catalyst during microwave irradiation. In one aspect, microwave irradiation can enable selective bond activation. In another aspect, integration of a microwave reactor with catalysts sensitive to electromagnetic energy can significantly increase the selectivity and yields of desired products. In a further aspect, the disclosed method integrates microwave plasma and catalytic methane decomposition.

In a further aspect, the thermal fluid is waste heat from an industrial process, a energy generation process, a manufacturing process, and the like. In a still further aspect, the thermal fluid is heated air, such as a heated air from an industrial process, a energy generation process, a manufacturing process, and the like. In a yet further aspect, the thermal fluid has a temperature from about 150° C. to about 500° C.

In a further aspect, the process gas comprises methane. In a still further aspect, the process gas comprises at least 50%

(v/v) methane, at least 55% (v/v) methane, at least 60 (v/v) methane, at least 65% (v/v) methane, at least 70% (v/v) methane, at least 75 (v/v) methane, at least 80% (v/v) methane, at least 85% (v/v) methane, at least 90% (v/v) methane, at least 95% (v/v) methane, at least 96% (v/v) methane, at least 97% (v/v) methane, at least 98% (v/v) methane, at least 99% (v/v) methane, or substantially 100 (v/v) methane. In a still further aspect, the process gas can be a range with a lower and an upper limit selected from any of the foregoing values.

In a further aspect, the method is carried out at a gas hourly space velocity (GHSV) from about 1000 h to about 25000 h. In a still further aspect, the method is carried out at a gas hourly space velocity (GHSV) from about 2500 h to about 20000 h. In a yet further aspect, the method is carried out at a gas hourly space velocity (GHSV) from about 5000 h to about 15000 h.

In a further aspect, the method can be carried out with the process gas at a pressure from about 0.1 atm to about 200 atm. In a still further aspect, the method is carried out with the process gas at a pressure of about 0.1 atm, 0.2 atm, 0.5 atm, 0.6 atm 0.7 atm, 0.8 atm, 0.9 atm, 0.95 atm, 1.0 atm, 1.05 atm, 1.1 atm, 1.2 atm, 1.5 atm, 1.6 atm 1.7 atm, 1.8 atm, 1.9 atm, 1.95 atm, 2.0 atm, 2.5 atm, 3.0 atm, 3.5 atm, 4.0 atm, 4.5 atm, 5.0 atm, 7.5 atm, 10 atm, 15 atm, 20 atm, 25 atm, 30 atm, 40 atm, 50 atm, 60 atm, 70 atm, 80 atm, 90 atm, 100 atm, 110 atm, 115 atm, 120 atm, 125 atm, 130 atm, 140 atm, 150 atm, 160 atm, 170 atm, 180 atm, 190 atm, or 200 atm; or a range with a lower limit and an upper limit selected from the foregoing values; or a set of values selected from the foregoing values. In a yet further aspect, the method can be carried out with the process gas at a pressure from about 0.7 atm to about 1.3 atm. In an even further aspect, the method can be carried out with the process gas at a pressure from about 0.8 atm to about 1.2 atm. In a still further aspect, the method can be carried out with the process gas at a pressure from about 0.9 atm to about 1.1 atm. In a yet further aspect, the method can be carried out with the process gas at a pressure from about 0.95 atm to about 1.05 atm.

In one aspect, the reactor is a disclosed hybrid microwave-thermal chemical reactor device. In another aspect, the disclosed hybrid microwave-thermal chemical reactor device can provide microwave energy of about 915 MHz to about 20 GHz, or of about 915, 950, or 975 MHz, or 1, 2, 3, 4, 5, 6, 7, 8, 9, 10, 11, 12, 13, 14, 15, 16, 17, 18, 19, or about 20 GHz, or a combination of any of the foregoing values, or a range encompassing any of the foregoing values. In another aspect, the reactor can be operated in a system having a variable frequency from about 5.85 to about 8.25 GHz. In a further aspect, the reactor can be operated in a system having a variable frequency from about 5.85 to about 6.85 GHz. In one aspect, a cavity that is lower (i.e., 915 MHz) can allow for scaling of the reaction to high power (>50 kW) generators for industrial use. In any of the above aspects, the reactor cavity is designed for extending a uniform microwave field through the length of an inner quartz reactor tube. In one aspect, the microwave generator can be from about 200 W to about 10 MW, or at about 200, 400, 600, or 800 W, or about 1, 10, 15, 20, 25, 30, 35, 40, 45, 50, 55, 60, 65, 70, 75, 80, 85, 90, or 95 kW, or about 1, 2, 3, 4, 5, 6, 7, 8, 9, or 10 MW, or a combination of any of the foregoing values, or a range encompassing any of the foregoing values.

Commercially-available catalysts, especially those that are oxide-supported, are difficult to recover when dissolved in organic or inorganic solution. In one aspect, provided herein is a method for recycling and recovering the catalysts disclosed herein. In one aspect, although the catalysts disclosed herein exhibit excellent reproducibility in terms of hydrogen generation over time, they will eventually become spent or deactivated and will need to be regenerated or recycled. In another aspect, the method disclosed herein can be useful in regenerating or recycling the catalysts disclosed herein. In one aspect, spent catalysts can be refluxed with an acid such as, for example, nitric acid. In a further aspect, reflux can be carried out in one step or may require two steps, each with a different concentration of acid. In one aspect, the spent catalyst can be refluxed with nitric acid at a concentration of from 0.01 M to 15.7 M, or from about 0.5 M to 10 M, or from 0.5 M to 5 M, or the nitric acid concentration can be about 0.01, 0.05, 0.1, 0.5, 1, 1.5, 2, 2.5, 3, 3.5, 4, 4.5, 5, 5.5, 6, 6.6, 7, 7.5, 8, 8.5, 9, 9.5, 10, 10.5, 11, 11.5, 12, 12.5, 13, 13.5, 14, 14.5, 15, 15.5, or about 15.7 M, or a combination of any of the foregoing values, or a range encompassing any of the foregoing values. In another aspect, the spent catalyst can be refluxed at from about 25° C. to about 250° C., or from about 30° C. to about 140° C., or from about 40° C. to about 120° C., or can be refluxed at about 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, or about 250° C., or a combination of any of the foregoing values, or a range encompassing any of the foregoing values. In still another aspect, reflux can be conducted for from about 0.5 to about 36 hours, or from about 0.5 to about 24 hours, or from about 1 to about 18 hours, or for about 0.5, 1, 1.5, 2, 2.5, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, or about 36 hours, or a combination of any of the foregoing values, or a range encompassing any of the foregoing values. In one aspect, the spent catalyst can be refluxed with 3M $HNO_3$ at 120° C. for 4 h, followed by reflux with concentrated $HNO_3$ at 140° C. for 12 h. In some aspects, dilute nitric acid can be used for either of these reflux steps. In one aspect, the nitric acid can have a concentration from about 0.1 M to about 15.8 M, or is about 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, or about 15.8 M or a combination of any of the foregoing values, or a range encompassing any of the foregoing values. In one aspect, reflux is conducted with continuous magnetic stirring.

In another aspect, following reflux, solid carbon particles and nanostructures can be filtered and washed with a solvent such as, for example, deionized water. In one aspect, when the metals are dissolved in acid solutions, they re-form metal counter-ion precursors, wherein the counter-ions are sourced from the acids. Thus, further in this aspect, the following scheme for nickel in nitric acid is generalizable to other metals and acids with stoichiometries determined based on metal oxidation state and counter-ion charge:

$$Ni + 4HNO_3 \rightarrow Ni(NO_3)_2 + 2NO_2 + 2H_2O$$

In one aspect, the carbon particles can be dried at elevated temperature such as, for example, at 80° C. Following drying, in another aspect, a portion of the carbon particles can be used in the next catalytic cycle. In one aspect, from about 1 to about 99 wt % of the carbon particles can be used in the next catalytic cycle, or from about 5 to about 90 wt % of the carbon particles can be used in the next catalytic cycle, or from about 10 to about 50% of the carbon particles can be used in the next catalytic cycle, or about 1, 5, 10, 15, 20, 25, 30, 35, 40, 45, 50, 55, 60, 65, 70, 75, 80, 85, 90, 95, or about 99 wt % of the carbon particles can be used in the next catalytic cycle, or a combination of any of the foregoing values, or a range encompassing any of the foregoing values.

In some aspects, Raman spectroscopy can be used to evaluate the compositions disclosed herein after 1, 2, 3, 4, 5, or more cycles of use. In some aspects, the "ID/IG" ratio can be used as a basis for estimating amount of structured versus unstructured carbon in a sample. In one aspect, the D band is reflective of disordered structure and is located between about 1300 and about 1400 $cm^{-1}$ and the G band is reflective of content of $sp^2$ hybridized carbon (i.e., ordered) and is located between about 1500 and about 1600 $cm^{-1}$, although these values can vary slightly based on particular aspects of the samples being analyzed. ID/IG ratio is most helpful when comparing similar samples such as, for example, catalyst/CNT compositions after one or more use cycles as disclosed herein. A relatively higher ID/IG ratio (i.e., comparison of relative peak areas) indicates a larger proportion of disordered carbon is present in a sample, while a relatively lower ID/IG ratio indicates a larger proportion of structured or $sp^2$ hybridized carbon is present. An unchanged ID/IG between different treatments indicates the proportions of structured and unstructured carbon are essentially unchanged between treatments.

In one aspect, the method further includes step of using a portion of the at least one solid carbon product as a supporting solid carbon product to restart the method beginning at the initial step. In another aspect, about 5 to about 90 wt % of the at least one solid carbon product is used to restart the method, or about 10 to about 50 wt % of the at least one solid carbon product, or about 5, 10, 15, 20, 25, 30, 35, 40, 45, 50, 55, 60, 65, 70, 75, 80, 85, or about 90 wt % of the solid carbon product is used, or a combination of any of the foregoing values, or a range encompassing any of the foregoing values.

In still another aspect, the acid composition can include nitric acid. In another aspect, the nitric acid is from about 0.5 to about 12 M, or is about 3 M, or is about 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, or about 12 M, or a combination of any of the foregoing values, or a range encompassing any of the foregoing values. In some aspects, step (c) is carried out for about 3-5 h at from about 110 to about 130° C., or for about 4 h at about 120° C. In still another aspect, the solid carbon product and the catalyst can be contacted with a second acid composition. In another aspect, the second acid composition can be nitric acid. In a further aspect, the second acid composition can be concentrated nitric acid and the contact with this second acid composition is for about 12 hours at from about 130 to about 150° C., or at about 140° C.

In any of these aspects, the method can be repeated at least 1, 2, 3, or 4 times without a degradation in performance.

In any of these aspects, the method can be conducted in an inert atmosphere. In a further aspect, the inert atmosphere can include nitrogen, argon, or a combination thereof. In one aspect, the reaction gas hourly space velocity can be from about 5000 to about 50,000 $h^{-1}$, or can be about 5000, 6000, 7000, 8000, 9000, 10,000, 20,000, 30,000, 40,000 or about 50,000 $h^{-1}$, or can be about 10,000 $h^{-1}$. In another aspect, the method can be carried out for from about 5 to about 800 min for each cycle, or at about 5, 10, 15, 20, 25, 50, 75, 100, 125, 150, 175, 200, 225, 250, 275, 300, 350, 400, 450, 500, 550, 600, 650, 700, 750, or about 800 min, or a combination of any of the foregoing values, or a range encompassing any of the foregoing values.

In any of these aspects, at least 5, 10, 20, 30, 40, or at least 50% or greater of the hydrocarbon gas is converted to hydrogen and solid carbon products.

In any of these aspects, the thermal fluid has a pressure from about 0.1 bar to about 2000 bar. In a further aspect, the thermal fluid has a pressure of about 0.1 bar, 1 bar, 5 bar, 10 bar, 15 bar, 20 bar, 25 bar, 50 bar, 100 bar, 150 bar, 200 bar, 250 bar, 500 bar, 750 bar, 1000 bar, 1100 bar, 1150 bar, 1200 bar, 1250 bar, 1500 bar, 1750 bar, or 2000 bar; a range having a lower limit and an upper limit selected from any of the foregoing values; or a set of values selected from the any of the foregoing values.

Also disclosed herein are products comprising hydrogen and at least one solid carbon product, produced by the methods disclosed herein.

G. Crystalline Carbon Materials

In one aspect, the disclosed devices and methods provide crystalline carbon materials. In a further aspect, the crystalline carbon materials are nanostructured carbon materials, e.g., carbon nanotubes. In a still further aspect, the nanostructured carbon that is a product of the reactions disclosed herein can be utilized as a support for the catalyst compositions and is recovered with the catalyst during the disclosed recycling process. In a yet further aspect, some amount of nanostructured carbon will be available after catalyst recycling for recovery as a product material. Still further in this aspect, this nanostructured carbon is purified and dried due to processing in the catalyst recovery step and can be further characterized by any means known in the art including, but not limited to, electron microscopy to evaluate structure, width, and length, X-ray diffraction and/or Raman spectroscopy to assess crystallinity, thermogravimetric analysis to assess whether any amorphous carbon is present, and similar techniques.

In a further aspect, the disclosed devices and methods provide carbon nanotubes having a diameter from about 5 nm to about 200 nm. In a yet further aspect, the disclosed devices and methods provide carbon nanotubes having a diameter from about 5 nm to about 100 nm. In a still further aspect, the disclosed devices and methods provide carbon nanotubes having a diameter from about 10 nm to about 60 nm.

In some aspects, the CNT and CNF that are produced are single-walled. In other aspects, multiwalled carbon nanotubes (MWCNT) may be produced. In one aspect, MWCNT have a diameter close to the particle size of Ni on CNT support. Without wishing to be bound by theory, a Ni/CNT catalyst may be particularly effective at forming MWCNT.

In another aspect, the solid carbon product can include nanoparticles, fullerenes, carbon filaments, single-walled carbon nanotubes (SWCNT), multi-walled carbon nanotubes (MWCNT), carbon nanofibers (CNF), or a combination thereof. In another aspect, the solid carbon product is SWCNT, MWCNT, and/or CNF. In a further aspect, the SWCNT, MWCNT, and/or CNF can have an outer diameter from about 10 to about 500 nm, or from about 15 to about 300 nm, or of about 10, 25, 50, 75, 100, 125, 150, 175, 200, 225, 250, 275, 300, 325, 350, 375, 400, 425, 450, 475, or about 500 nm, or a combination of any of the foregoing values, or a range encompassing any of the foregoing values. In another aspect, the SWCNT, MWCNT, and/or CNF can have a length from about 20 nm to about 50 μm, or from about 20 nm to about 50 μm, or from about 50 nm to about 25 μm, or of about 20, 40, 50, 60, 80, 100, 250, 500, or 750 nm or about 1, 2, 5, 10, 15, 20, 25, 30, 35, 40, 45, or about

H. Uses of Disclosed Carbon Nanotubes/Crystalline Carbon

In various aspects, the disclosed carbon nanotubes and crystalline carbon materials formed using the disclosed processes and devices can be used any end-use application utilizing such materials. In one aspect, the crystalline carbon (i.e., CNTs and CNFs) generated from the process disclosed herein can be used as intermediates to make carbon fibers, carbon composites, and electrodes useful for electric arc steel production. In another aspect, CNT and CNF may be useful for the production of integrated circuits, hydrogen storage devices, lithium batteries, solar photovoltaic cells, fuel cells, drug delivery, and other applications. In a further aspect, the processes disclosed herein can produce both single-walled and multi-walled CNTs.

In a further aspect, the disclosed carbon nanotubes and crystalline carbon materials formed using the disclosed processes and devices can be dispersed in another medium such as a liquid solvent solution or molten material in order to form a composite comprising nanotubes and a matrix material which can be polymeric, metallic, organic, inorganic or combinations thereof. When the disclosed carbon nanotubes and crystalline carbon materials formed using the disclosed processes and devices are dispersed in a matrix material, the physical, electrical, chemical and thermal properties of the composite material can be different compared to those of the matrix material alone. The properties of the composites comprising the disclosed carbon nanotubes and crystalline carbon materials formed using the disclosed processes and devices depend, in part, on the concentration of nanotubes in the composite and on the diameter, length and morphology of carbon nanotubes in the matrix material. For example, when blending the disclosed carbon nanotubes and crystalline carbon materials formed using the disclosed processes and devices in liquids, the length distribution of the nanotubes can affect the viscosity characteristics of the liquid/nanotube mixture. The properties of the composite are highly dependent on how effectively the carbon nanotubes are dispersed in the composite. There is a substantial need for carbon nanotube materials that can easily be dispersed in matrix materials, and particularly those that can be dispersed by commercially-effective methods such as melt blending.

The disclosed carbon nanotubes and crystalline carbon materials formed using the disclosed processes and devices can be dispersed in a matrix material selected from the group consisting of polymers, metals, inorganic materials, organic materials and combinations thereof to form composites of carbon nanotube particulates in matrix materials. The disclosed carbon nanotubes and crystalline carbon materials formed using the disclosed processes and devices dispersed in matrix materials can be present in the composite in a range of about 0.001 wt % and about 50 wt %.

I. References

References are cited herein throughout using the format of reference number(s) enclosed by parentheses corresponding to one or more of the following numbered references. For example, citation of references numbers 1 and 2 immediately herein below would be indicated in the disclosure as (Refs. 1 and 2).

Ref 1. IEA, "The Future of Hydrogen," Pairs, 2019.

Ref 2. B. Parkinson, P. Balcombe, J. F. Speirs, A. D. Hawkes, and K. Hellgardt, "Levelized cost of CO2 mitigation from hydrogen production routes," Energy Environ. Sci., vol. 12, no. 1, pp. 19-40, 2019.

Ref 3. Y. Khojasteh Salkuyeh, B. A. Saville, and H. L. MacLean, "Techno-economic analysis and life cycle assessment of hydrogen production from natural gas using current and emerging technologies," Int. J. Hydrogen Energy, vol. 42, no. 30, pp. 18894-18909, 2017.

Ref 4. L. Alves, V. Pereira, T. Lagarteira, and A. Mendes, "Catalytic methane decomposition to boost the energy transition: Scientific and technological advancements," Renew. Sustain. Energy Rev., vol. 137, p. 110465, 2021.

Ref 5. Z. Fan, W. Weng, J. Zhou, D. Gu, and W. Xiao, "Catalytic decomposition of methane to produce hydrogen: A review," J. Energy Chem., vol. 58, pp. 415-430, 2021.

Ref 6. M. Msheik, S. Rodat, and S. Abanades, "Methane Cracking for Hydrogen Production: A Review of Catalytic and Molten Media Pyrolysis," Energies, vol. 14, no. 11, 2021.

Ref 7. S. Schneider, S. Bajohr, F. Graf, and T. Kolb, "State of the Art of Hydrogen Production via Pyrolysis of Natural Gas," ChemBioEng Rev., vol. 7, no. 5, pp. 150-158, 2020.

Ref 8. Y. Shen and A. C. Lua, "Synthesis of Ni and Ni—Cu supported on carbon nanotubes for hydrogen and carbon production by catalytic decomposition of methane," Appl. Catal. B Environ., vol. 164, pp. 61-69, 2015.

Ref 9. H. F. Abbas and W. M. A. Wan Daud, "Hydrogen production by methane decomposition: A review," Int. J. Hydrogen Energy, vol. 35, no. 3, pp. 1160-1190, 2010.

Ref 10. M. Pudukudy, Z. Yaakob, and Z. S. Akmal, "Direct decomposition of methane over Pd promoted Ni/SBA-15 catalysts," Appl. Surf. Sci., vol. 353, pp. 127-136, 2015.

Ref 11. Y. Li, B. Zhang, X. Xie, J. Liu, Y. Xu, and W. Shen, "Novel Ni catalysts for methane decomposition to hydrogen and carbon nanofibers," J. Catal., vol. 238, no. 2, pp. 412-424, 2006.

Ref 12. U. P. M. Ashik, W. M. A. Wan Daud, and H. F. Abbas, "Production of greenhouse gas free hydrogen by thermocatalytic decomposition of methane—A review," Renew. Sustain. Energy Rev., vol. 44, pp. 221-256, 2015.

Ref 13. D. Ayillath Kutteri, I.-W. Wang, A. Samanta, L. Li, and J. Hu, "Methane decomposition to tip and base grown carbon nanotubes and COx-free H2 over mono- and bimetallic 3d transition metal catalysts," Catal. Sci. Technol., vol. 8, no. 3, pp. 858-869, 2018.

Ref 14. N. Shah, S. Ma, Y. Wang, and G. P. Huffman, "Semi-continuous hydrogen production from catalytic methane decomposition using a fluidized-bed reactor," Int. J. Hydrogen Energy, vol. 32, no. 15, pp. 3315-3319, 2007.

Ref 15. I.-W. Wang et al., "Catalytic decomposition of methane into hydrogen and high-value carbons: combined experimental and DFT computational study," Catal. Sci. Technol., vol. 11, no. 14, pp. 4911-4921, 2021.

Ref 16. M. A. Salam and B. Abdullah, "Catalysis mechanism of Pd-promoted γ-alumina in the thermal decomposition of methane to hydrogen: A density functional theory study," Mater. Chem. Phys., vol. 188, pp. 18-23, 2017.
Ref 17. C. Jiang et al., "Methane Catalytic Pyrolysis by Microwave and Thermal Heating over Carbon Nanotube-Supported Catalysts: Productivity, Kinetics, and Energy Efficiency," Ind. \& Eng. Chem. Res., vol. 61, no. 15, pp. 5080-5092, 2022.
Ref 18. Z. Ye, W. D. Deering, A. Krokhin, and J. A. Roberts, "Microwave absorption by an array of carbon nanotubes: A phenomenological model," Phys. Rev. B, vol. 74, no. 7, p. 75425, August 2006.
Ref 19. M. Xu et al., "Structure sensitivity and its effect on methane turnover and carbon co-product selectivity in thermocatalytic decomposition of methane over supported Ni catalysts," Appl. Catal. A Gen., vol. 611, p. 117967, 2021.
Ref 20. M. Mohiuddin and S. V Hoa, "Temperature dependent electrical conductivity of CNT-PEEK composites," Compos. Sci. Technol., vol. 72, no. 1, pp. 21-27, 2011.
Ref 21. A. Aqel, K. M. M. A. El-Nour, R. A. A. Ammar, and A. Al-Warthan, "Carbon nanotubes, science and technology part (I) structure, synthesis and characterisation," Arab. J. Chem., vol. 5, no. 1, pp. 1-23, 2012.
Ref 22. H. Wang, X. Kou, J. Zhang, and J. Li, "Large scale synthesis and characterization of Ni nanoparticles by solution reduction method," Bull. Mater. Sci., vol. 31, no. 1, pp. 97-100, 2008.
Ref 23. R. Bhaskar, J. Li, and L. Xu, "A Comparative Study of Particle Size Dependency of IR and XRD Methods for Quartz Analysis," Am. Ind. Hyg. Assoc. J., vol. 55, no. 7, pp. 605-609, 1994.
Ref 24 S. A. Hooker, R. Geiss, R. Schilt, and A. Kar, "Rapid Inspection of Carbon Nanotube Quality," Nanostructured Mater. Nanotechnol., pp. 119-130, 2009.
Ref 25. L. Bokobza, J.-L. Bruneel, and M. Couzi, "Raman Spectra of Carbon-Based Materials (from Graphite to Carbon Black) and of Some Silicone Composites," C, vol. 1, no. 1, pp. 77-94, 2015.
Ref 26. A. Gohier, C. P. Ewels, T. M. Minea, and M. A. Djouadi, "Carbon nanotube growth mechanism switches from tip- to base-growth with decreasing catalyst particle size," Carbon N. Y., vol. 46, no. 10, pp. 1331-1338, 2008.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain features and subcombinations are of utility and may be employed without reference to other features and subcombinations. This is contemplated by and is within the scope of the claims.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

J. Examples

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Experimental Introduction.

Methane catalytic pyrolysis is a promising solution for producing hydrogen and valuable carbon nanotubes (CNTs) from natural gas without the production of $CO_2$ emissions. Disclosed herein are examples relating to the disclosed microwave-enhanced methane catalytic pyrolysis using a hybrid fixed bed reactor that allows for microwave heating and combined thermal microwave, i.e., "hybrid" heating methods and devices. In hybrid heating mode examples, the catalyst was heated to a temperature of 500° C. with hot air, and then the catalyst temperature was raised to the operating temperature utilizing microwave irradiation. The Ni—Pd/CNT catalyst was tested at 550-650° C. under hybrid or microwave-only conditions. Hybrid heating was found to have a higher methane conversion than microwave heating alone. Without wishing to be bound by a particular theory, it is believed that the higher conversion can be attributed to more efficient utilization of the catalyst bed and temperature uniformity, as suggested by the thermal imaging results. The power required to maintain the reaction temperature was reduced in the hybrid heating mode by over 60% of what was initially needed under microwave heating only. XRD, Raman, TGA, and TEM were used to characterize the morphology of the carbon nanotube product formed. The disclosed examples herein experimentally show value of the disclosed methods and devices to lower the overall size of the microwave generator by using hybrid heating as disclosed herein, increase catalyst utilization, and reduce overall input energy requirements, thus lowering capital and energy costs required for catalytic pyrolysis of methane.

2. Experimental Methods.

Catalyst Synthesis. A bimetallic catalyst containing 11 wt. % Ni/Pd with a ratio of 10:1 Ni:Pd was prepared using as-dispersed, size-controlled nanoparticles of 10-30 nm supported on carbon nanotubes synthesized using a solvothermal process (Ref. 15). Nickel nitrate hexahydrate and palladium nitrate dihydrate were procured from Acros Organics and Sigma-Aldrich. Dry 20-30 nm diameter 10-30 μm in length multi-walled carbon nanotubes procured from Cheap Tubes were added to the metal precursors solution under stirring until well mixed. The precursors were dissolved in 50 ml of acetone under stirring until fully dissolved. The metal precursor and nanotube solution were then sonicated for 30 mins while minimizing evaporation. The sonicated mixture was then transferred to a Teflon-lined autoclave and placed in an oven set to 120° C. for 12 hours. The autoclave was then removed from the oven and allowed to cool to room temperature. The produced solution was then dried in air for 12 hours at 80° C. The prepared Ni—Pd/CNT catalyst was pulverized in a mortar and pestle until a fine powder was produced. The catalyst was then reduced in a hydrogen/nitrogen environment in a tube furnace set to 600° C. for 4 hours.

CNT Characterization. Oxidative-thermogravimetric analysis (TGA) was carried out in a TA-Instruments SDT-650. The unreacted catalyst, reacted catalysts, and the additional standard mixtures of the prepared catalyst, CNTs, and carbon black were also analyzed. These standards highlight the differences in the oxidation rate of amorphous and crystalline carbon. The samples were oxidated in a 50/50 mixture of nitrogen and air at a total flow rate of 100 sccm. The temperature was ramped from 50° C. to 450° C. at a rate of 10° C./min and held at 450° C. for 30 minutes. The temperature was then further ramped from 450° C. to 700° C. at 2° C./min. Transmission electron microscopy (TEM) was conducted using a JEOL TEM 2100 electron microscope operating at 200 kV. Images of the prepared catalyst and reacted catalysts were obtained, showing the size of the attached Ni/Pd nanoparticles and the morphology and size of the produced carbon products. The samples were sonicated in acetone for 10 minutes before loading onto a copper mesh grid coated with a formvar film. ImageJ software was used to measure the nanoparticle diameters by counting the linear pixels with the known pixel length corresponding to the resolution and displayed scale. Several images were used with care to not double count. X-ray diffraction (XRD) was carried out on a Panalytical X'pert Pro from 10° 2θ to 90° 2θ at 45 Kv using a rotating stage setup. The CNT catalyst was loaded into an XRD slide with the top prepared as flat as possible. Infrared images were recorded with a FLIR model A6261 short-wave infrared thermal imager. A factory-calibrated neutral density filter was installed for temperature measurements of 400-700° C. The camera was placed at a consistent distance of 0.5 meters from the catalyst bed resulting in a pixel resolution of 4 pixels per millimeter. Raman spectroscopy was performed using a Renishaw InVia Raman Microscope using a 532 nm laser at 10 mW laser. The spectra were accumulated 3 times with an exposure time of 10 seconds each.

Microwave and Hybrid Reactor. The catalyst was evaluated for methane pyrolysis under a combined thermal-microwave system. The setup can be seen in FIGS. 1A-1D, where a 900-watt 2.45 GHz Sairem GMS1000 solid-state generator complete with an automatic 4-stub tuner was used to supply microwave irradiation with minimal reflected power. Concentric quartz tubes of sizes 12 mm-OD×10 mm-ID and 24 mm-OD×20 mm-ID were placed in the center of a mono-mode high-temperature microwave cavity. 0.2 grams of catalyst was loaded into the inner 10 mm-ID tube supported by quartz wool. The catalyst bed temperature was monitored by a short-wave infrared Micro-Epsilon pyrometer model CTM-3SF75H1-C3. The catalyst was heated to operating temperature under 50 sccm of nitrogen in both MW only and Hybrid heating modes. In hybrid heating mode, the catalyst bed was thermally preheated to 500° C. by a SureHeat jet heater with an airflow rate of 8 scfm through the concentric quartz tubes. The catalyst bed was then raised from 500° C. to the selected operating temperatures of 550° C., 600° C., and 650° C. under microwave irradiation. In microwave-only mode, the catalyst was heated by microwave to reaction temperature at a 10° C./min rate to the corresponding temperature. Once reaction temperatures have been reached, the gas flow was changed to 40 sccm methane and 10 sccm nitrogen. The mass of the catalyst was recorded before and after the reaction. The reaction product gas was analyzed with a ThermoScientific Mass Spectrometer Prima BT.

3. Results and Discussion.

Figure 2A:
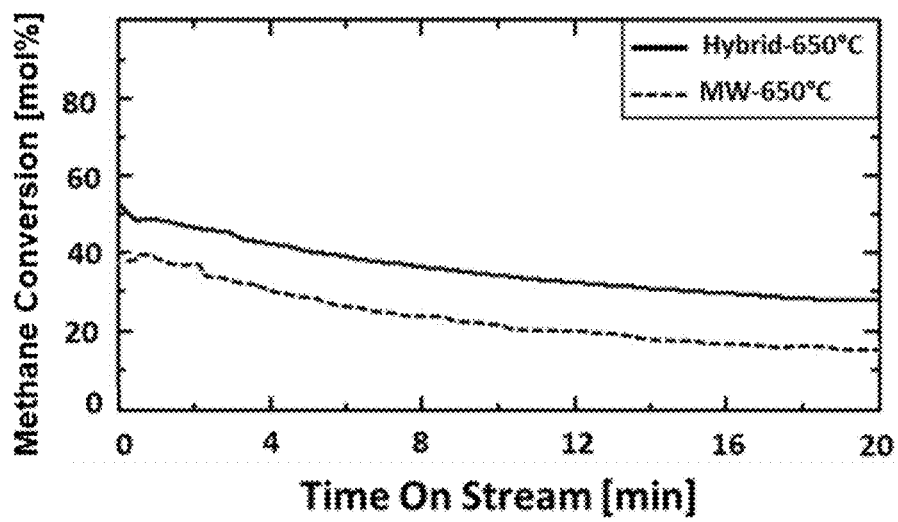
FIGS. 2A-2C show representative data for conversion of methane at various temperatures in both a disclosed hybrid heating mode and with microwave heating only.
Figure 2B:
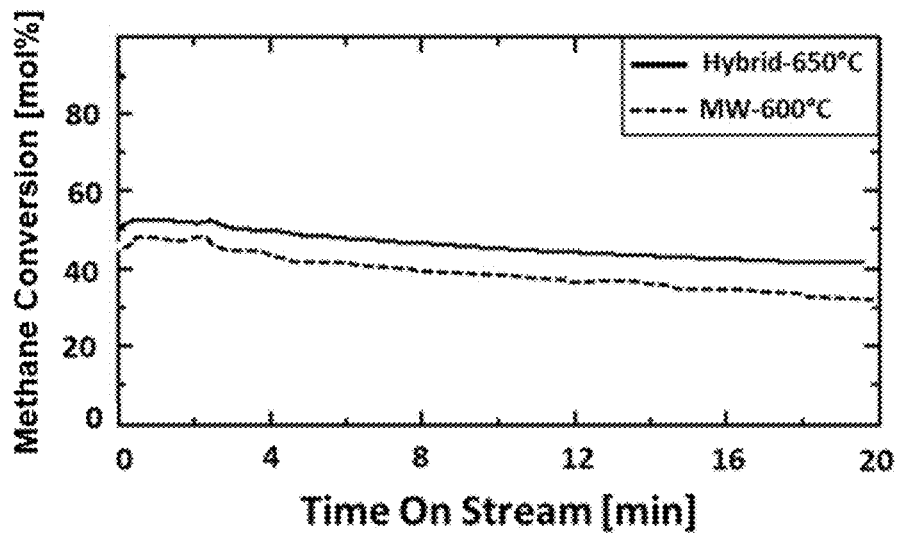
Figure 2C:
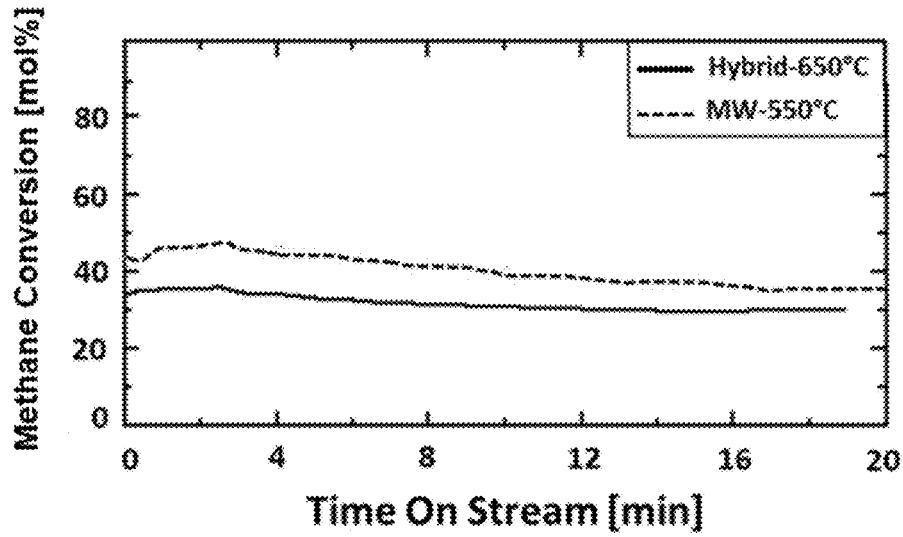

Performance of the Ni—Pd/CNT Catalyst. The 10Ni-1 Pd/CNT catalyst was tested under microwave heating conditions at three different temperatures of 550° C., 600° C., and 650° C. The microwave reactor directly heats the catalyst via joule heating of the CNT support and dielectric heating of the metal nanoparticles. This heating mechanism has been shown previously to improve the catalytic action compared to conventional heating by increasing the active site temperature while keeping the gas phase temperatures low (Ref. 17). As seen in FIGS. 2A-2C, the first-pass conversion of methane is approximately 50% at 550° C. and 600° C., with a significantly lower conversion rate at 650° C. As the reaction temperature increases in microwave heating, the rate of deactivation increases, likely due to sintering or Ostwald ripening the metal nanoparticles into larger and less active particles. Due to temperature-dependent dielectric properties, a microwave absorption "runaway" can occur, leading to hotspot formation that absorbs more microwave radiation than the cold spots in the system. Higher temperatures accelerate this process as the microwave generator does not homogenously heat the catalyst, and hotspots form, causing deactivation.

The hybrid heating mode was thought to create a more uniform temperature distribution across the catalyst bed in comparison to the microwave-only mode of heating. At 550° C., the hybrid heating mode resulted in a slightly lower conversion than microwave heating alone. The more uniform heat distribution resulted in the formation of less intense hotspot regions, decreasing catalyst conversion. However, as the reaction temperature increased to 600° C. and 650° C., the hybrid heating mode resulted in a higher conversion than microwave heating alone. The higher conversion at 600° C. and 650° C. demonstrates the importance of allowing a difference in reaction and preheated catalyst temperatures.

Figure 3A:
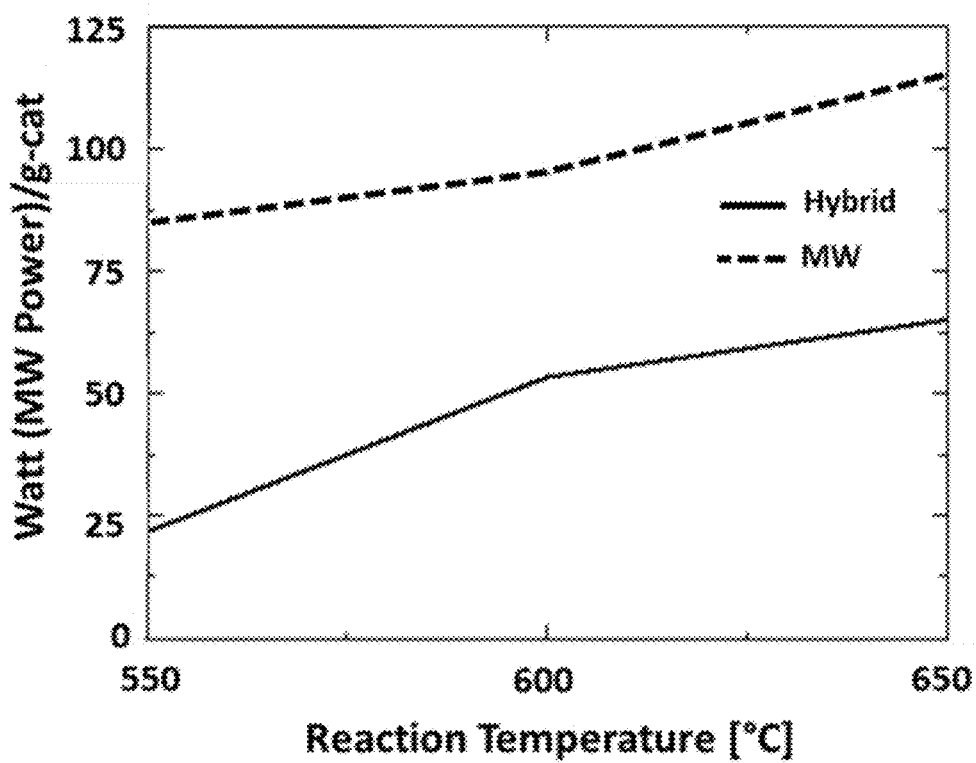
FIGS. 3A-3B show representative data relating to power consumption.
Figure 3B:
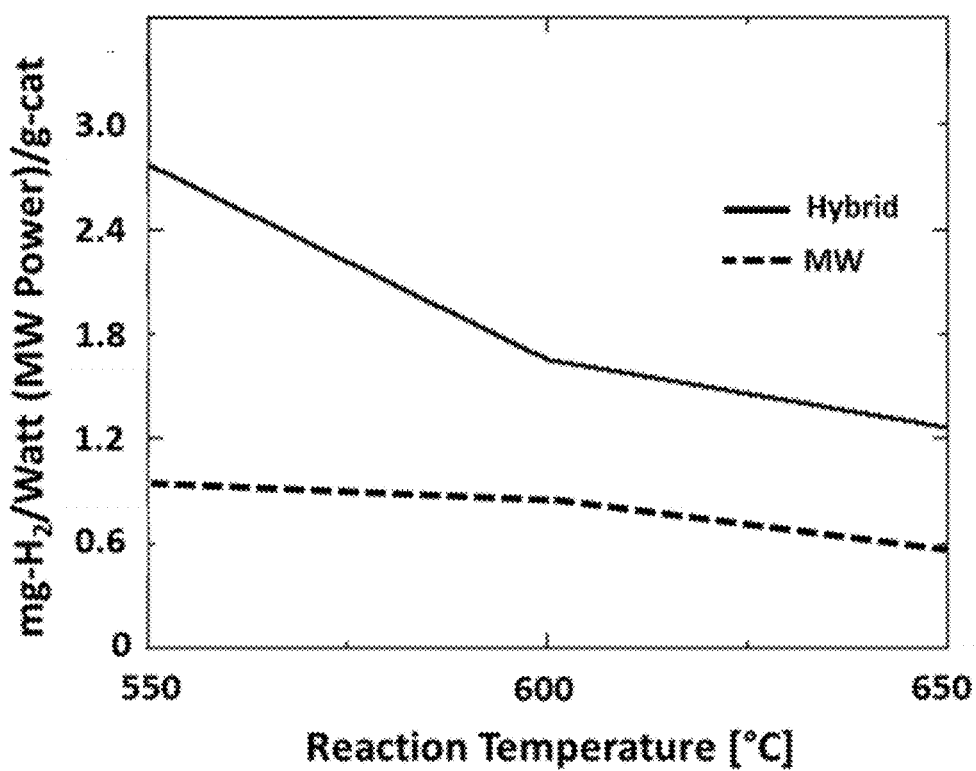

Hybrid heating of the Ni—Pd/CNT catalyst improves several deficiencies of microwave heating alone. As seen in FIG. 3a, the first improvement is the decrease in electrical energy required by the microwave generator to maintain the catalyst temperature on a watt/gram basis. The microwave's power consumption was reduced from 85 watts of microwave power at 550° C. under microwave irradiation to only 24 watts for the hybrid heating system. The hybrid heating mode also produced hydrogen more efficiently than the microwave heating alone on an mg-hydrogen/watt/gram catalyst basis, as seen in FIG. 3B. Most of the process heat needed for the reaction was derived from the heat exchange of hot air to the catalyst bed. As the reaction temperature was increased, more microwave power was required to reach the higher reaction temperatures. The higher reaction temperatures led to faster catalyst deactivation, with the greatest yield measured at 600° C. in hybrid mode. Hybrid heating dramatically reduces the electricity needed to perform microwave catalysis while improving catalyst productivity per watt of microwave irradiation. By utilizing industrial waste heat in scaled-up microwave reactor systems, the size and power of the system required could be significantly reduced, thus lowering the total capital cost and energy consumption.

Figure 4A:
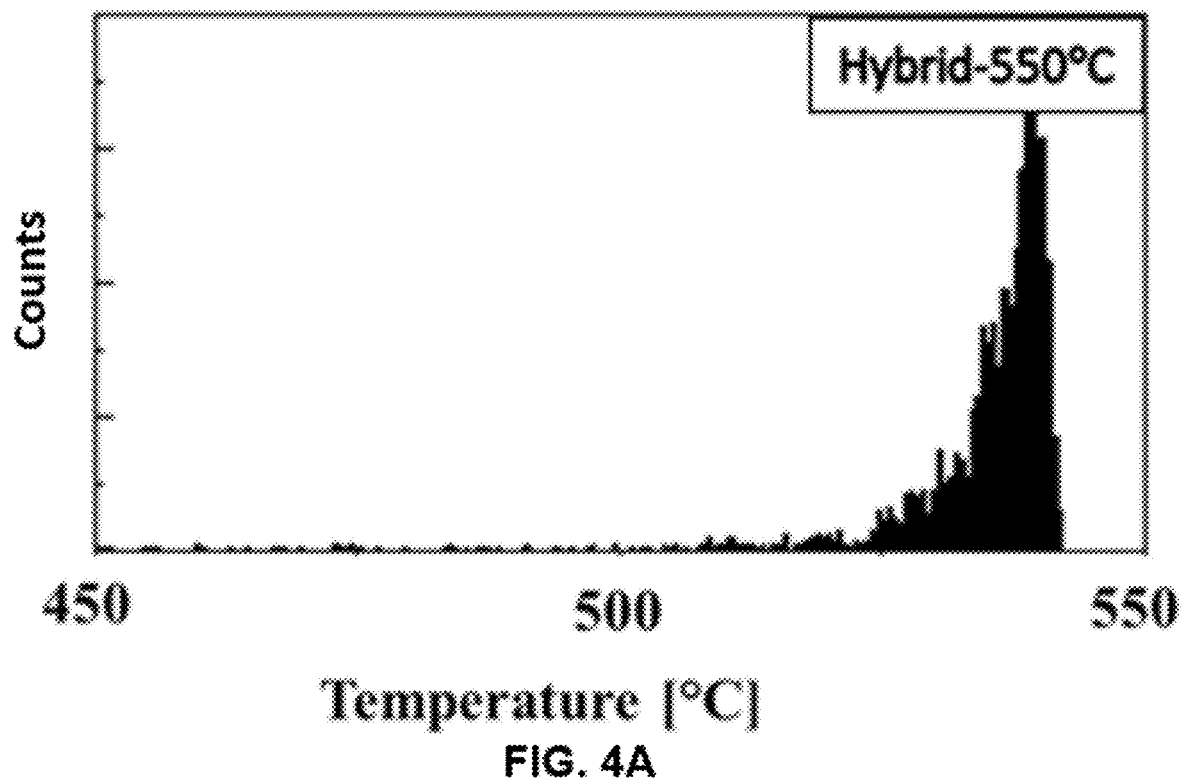
FIGS. 4A-4G show representative data for catalyst temperature distribution.
Figure 4B:
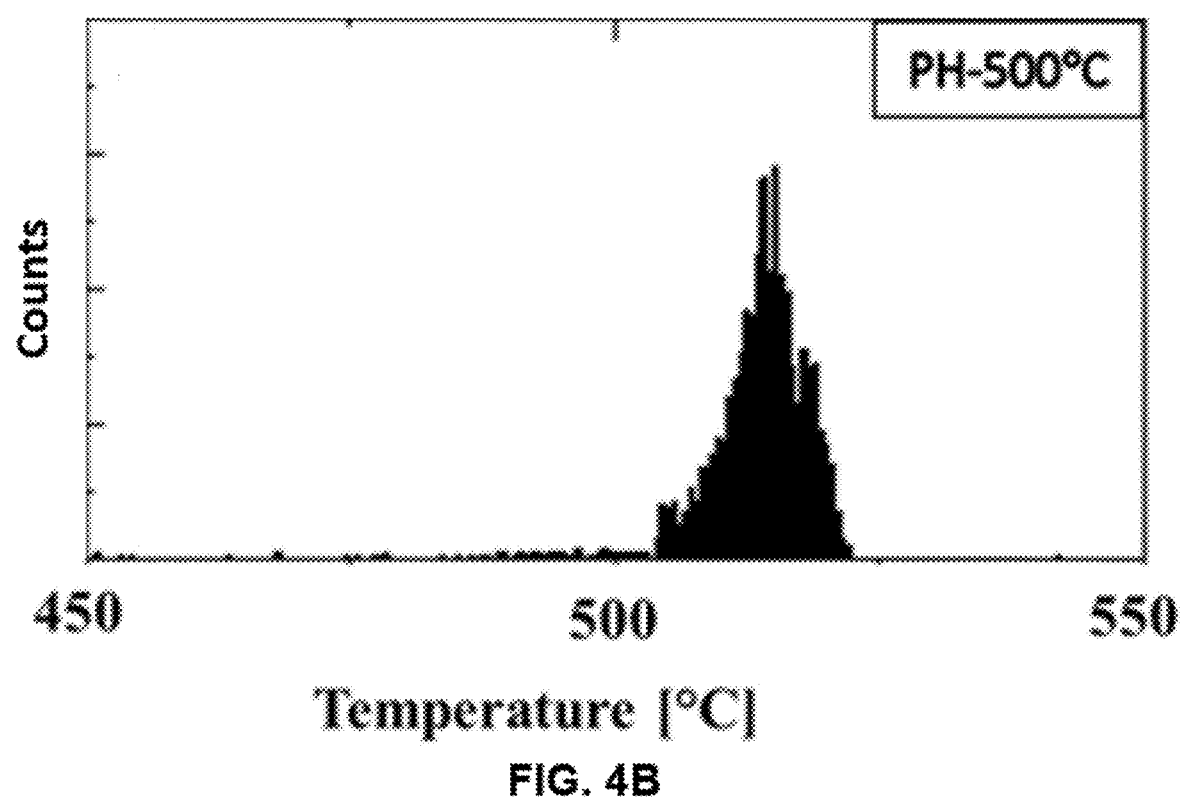

Temperature Distribution. The second improvement is the increase in catalyst bed utilization and a decrease in temperature variation across the catalyst bed. FIGS. 4A-4G show the histograms of the temperature distribution across the catalyst bed observed by a thermal imaging camera. FIGS. 4A-4B illustrate the wide surface temperature distribution recorded by the infrared camera for the MW-550° C., Hybrid-550° C., and the preheated catalyst. While there is a contradiction between the pyrometer and the average temperature values recorded by the infrared camera, this elucidates the packed beds' thermal behavior in both heating modes. The PH-500C heating with hot air only, as seen in FIG. 4B, produces a narrow surface temperature distribution centered around 510° C., which was the highest temperature achievable by the experimental setup.

Figure 4C:
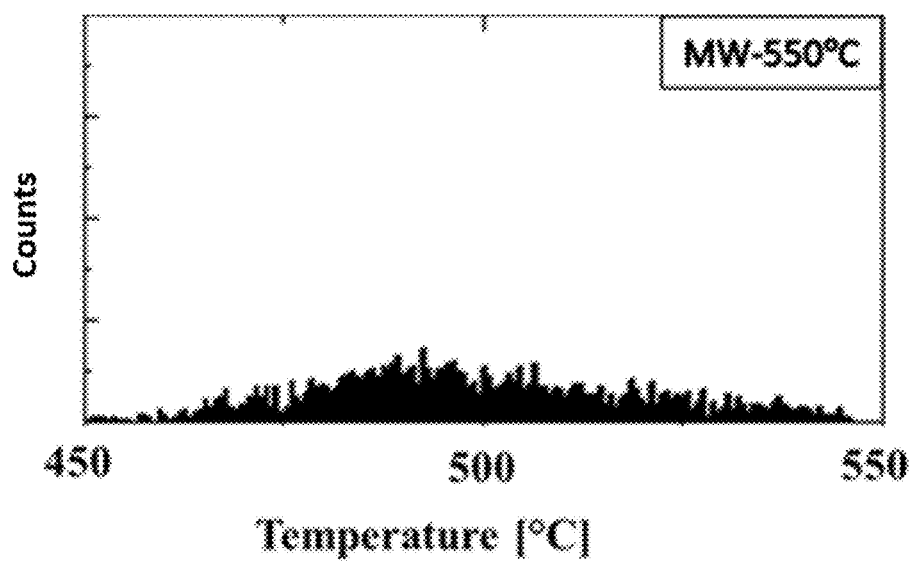
Figure 4D:
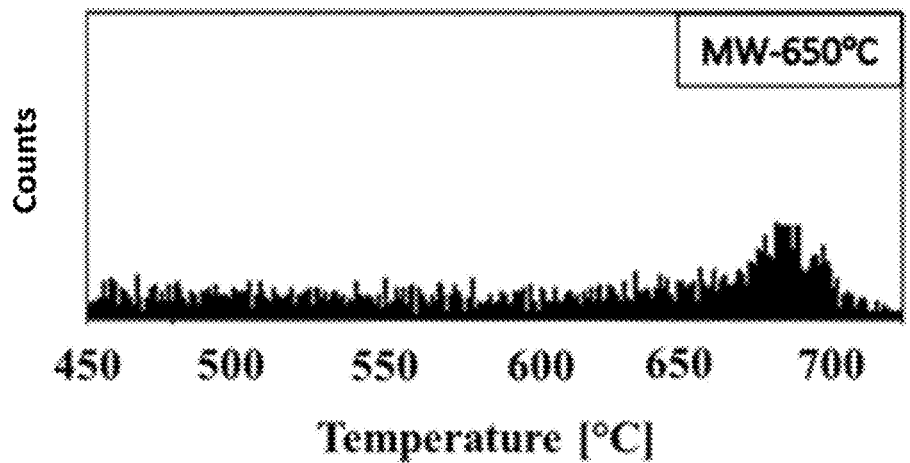
Figure 4E:
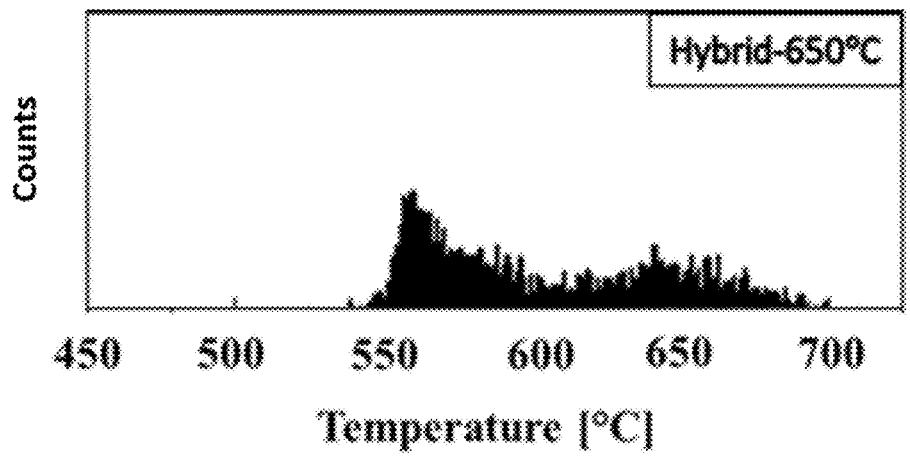
Figure 4F:
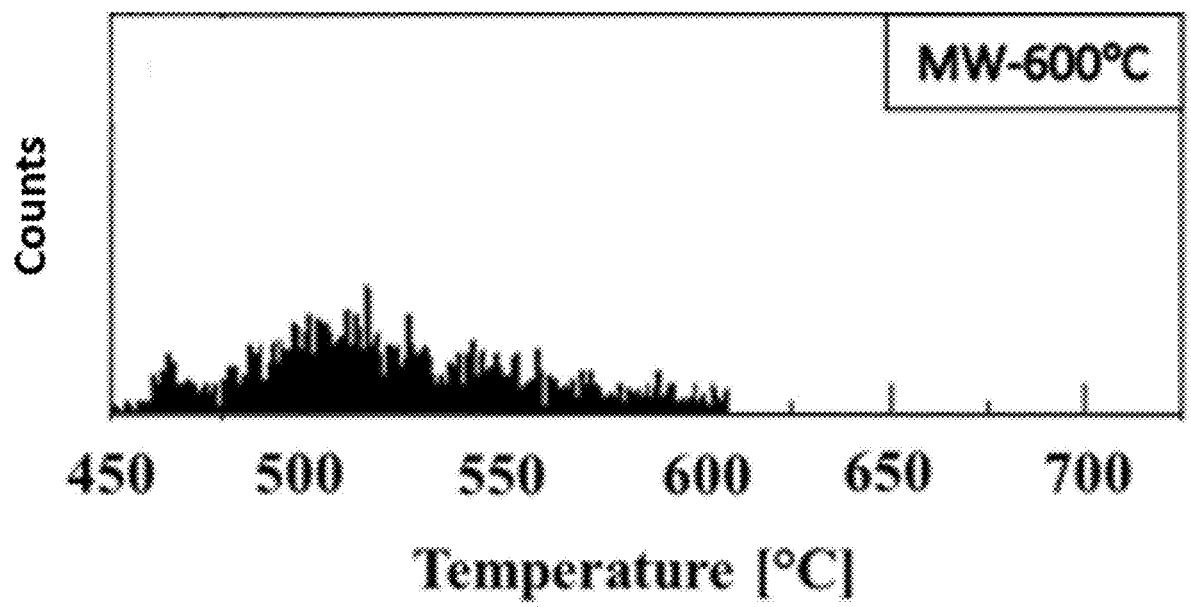
Figure 4G:
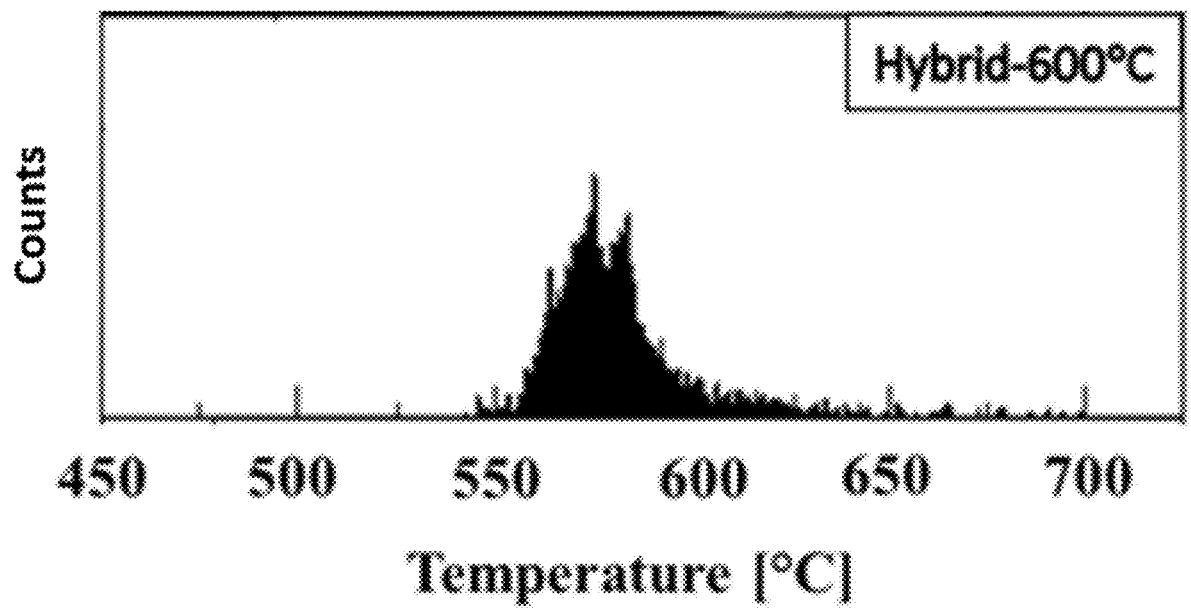

Hotspot formation and poor catalyst bed utilization were readily apparent in the MW heated catalysts, as indicated by the wide temperature distribution across the catalyst bed. The MW-550° C. temperature distribution, as seen in FIG. 4C, had a wide distribution range with a surface temperature centered around 490° C. The MW-650° C. temperature distribution, as seen in FIG. 4D, indicated that a hotspot had formed with a temperature centered around 680° C. and a wide range of temperature measurements below the 650° C. setpoint. Microwave heating alone was found to be more likely to cause hotspot formations. The cause of the hotspot formations is the consequence of temperature-dependent dielectric properties of the catalyst material and focused microwave irradiation. As the catalyst material is heated, the material's ability to absorb microwave irradiation changes, typically increasing with increasing temperatures (Ref. 20). It can also be seen in FIGS. 4A-4G, that the MW heated catalyst temperature distribution becomes more significant with increasing setpoint temperatures. This was attributed to increased heat losses from the catalyst bed at the higher temperature setpoints. The microwave also required more power to reach the setpoint temperature, thus amplifying the temperature inhomogeneity and the severity of the hotspot formed. Hotspot formation can greatly reduce the utilization of the catalyst bed and lead to accelerated deactivation at higher reaction temperatures.

Hybrid heating showed a more limited distribution and higher temperature median than microwave heating alone for all reaction temperatures, as seen in FIGS. 4A-4G. The narrower temperature distribution across the catalyst bed was attributed to the hybrid heating's insulating nature, thus resulting in fewer overall thermal losses from the catalyst bed. The narrow temperature distribution indicates that a more efficient catalyst bed utilization was achieved. Using a hybrid heated reactor could mitigate the effects of hotspot formations, thus improving the conversion efficiency and controllability of the temperature. These effects are mitigated by the hybrid mode of heating, which reduces microwave power, thus decreasing hotspot formation.

Figure 5:
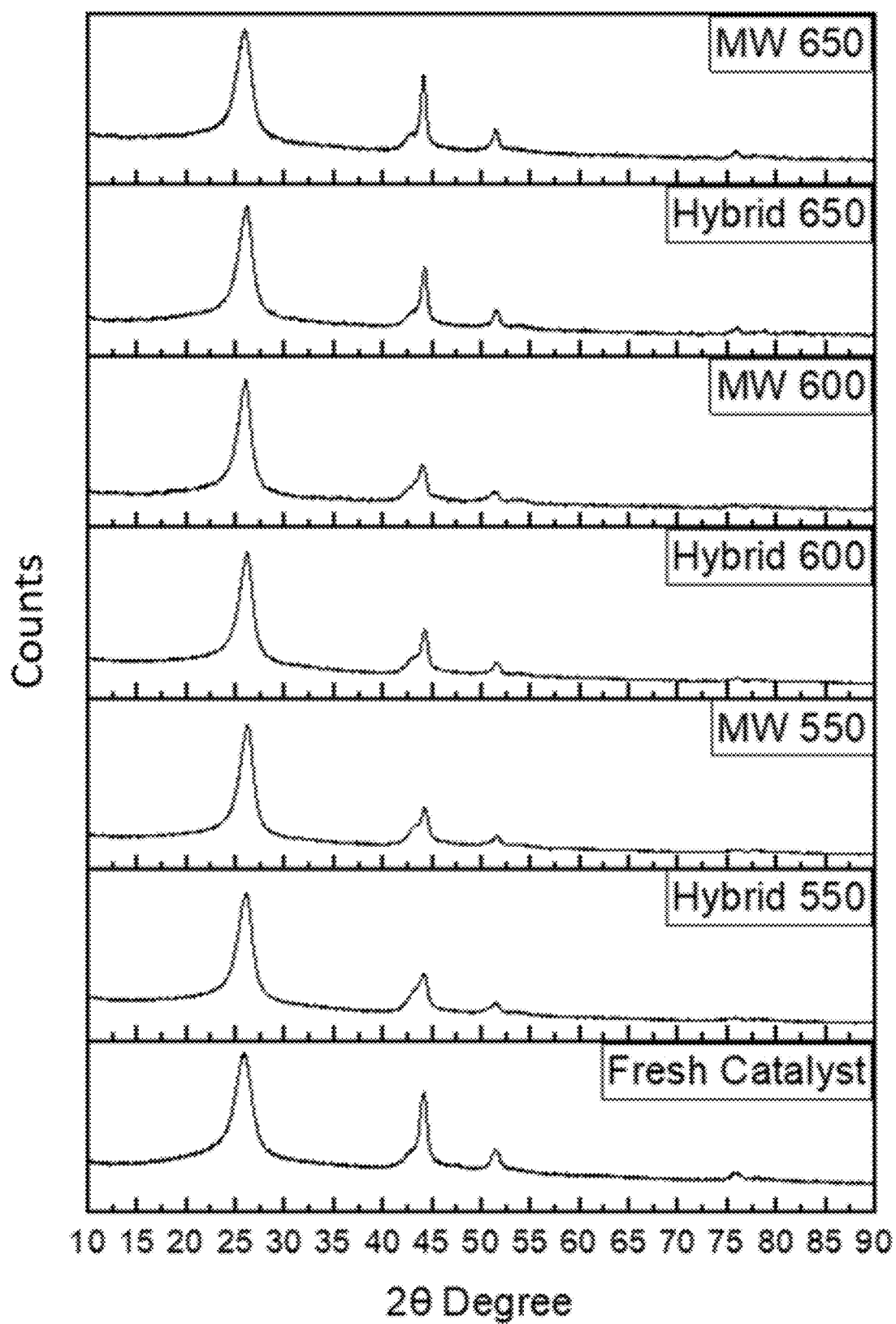
FIG. 5 shows representative XRD spectra of the fresh catalyst compared to the reacted hybrid and microwave heated at 550° C., 600° C., and 650° C. as indicated in the figure. Temperatures given are those of the catalyst bed temperature, which was monitored using a short-wave infrared Micro-Epsilon pyrometer (Micro-Epsilon USA, Raleigh, North Carolina).

X-Ray Diffraction. XRD of the catalyst was performed before and after the reaction under the specified heating method as seen in FIG. 5. The peaks at 26, 43, and 78 are characteristic of the CNT support. The minor peaks at 44, 54, and 76 present in the fresh catalyst indicate metallic nickel. The palladium is present in too small of an amount to be detectable above the instrument's noise at the particle size present in the catalyst (Refs. 21-22). There is a significant reduction in peak intensity of the metals at the lower reaction temperatures. This reduction in peak intensity is likely due to the greater sustained conversion, thus resulting in a higher overall yield at the lower reaction temperatures than the fast deactivation at 650° C. The decrease in the metal concentration or the formation of carbon covering the particles during the reaction obscures the metals' presence. However, at 650° C., there is no significant decrease in peak intensity, even with a yield only somewhat less than the lower reaction temperatures. This is due to sintering or Ostwald ripening of the metal particles during the reaction, thus increasing their size and appearance in the instrument (Ref. 23).

Figure 6A:
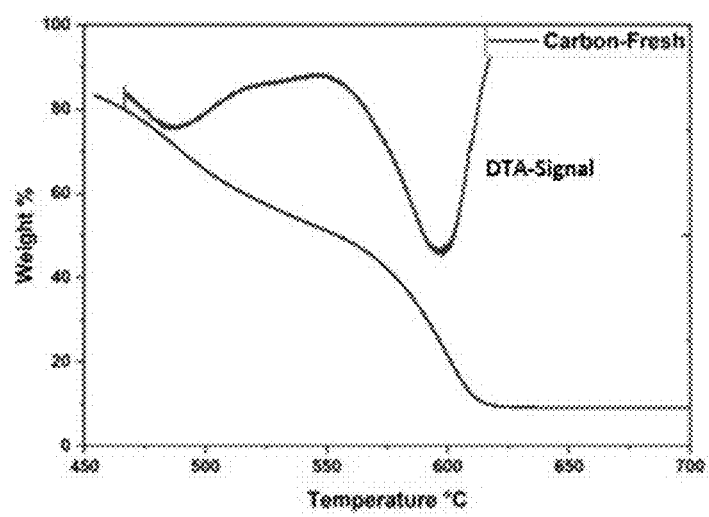
FIGS. 6A-6C show representative data for oxidative TGA weight loss and rate of weight change for standards in order to characterize the carbon produced as further discussed in the Examples.
Figure 6B:
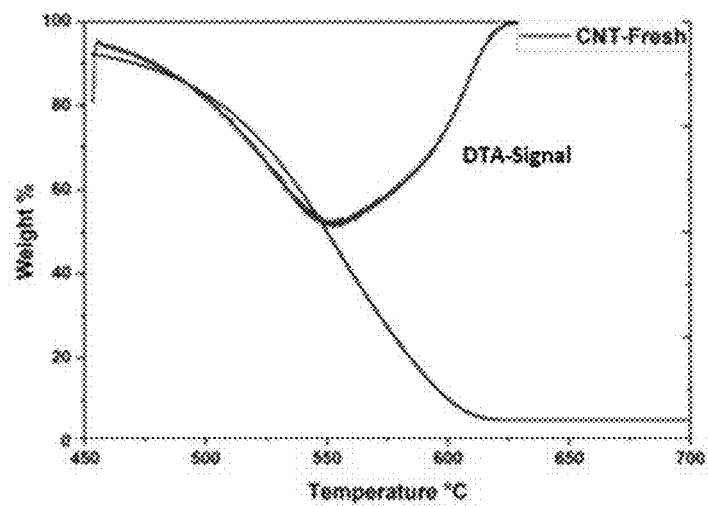
Figure 6C:
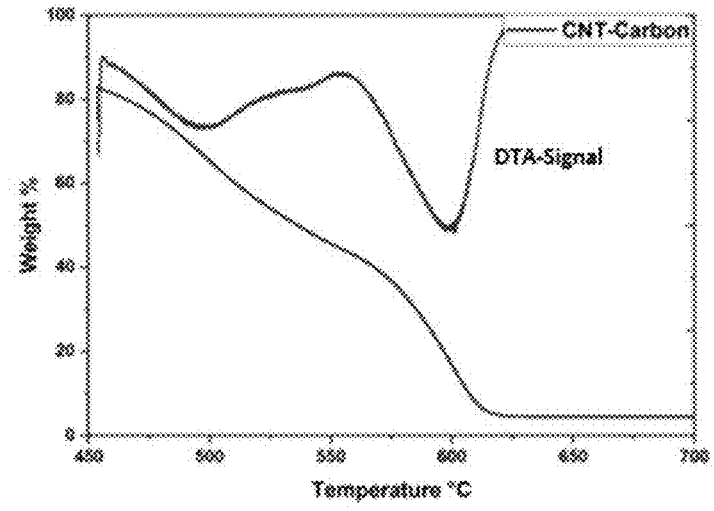
Figure 7B:
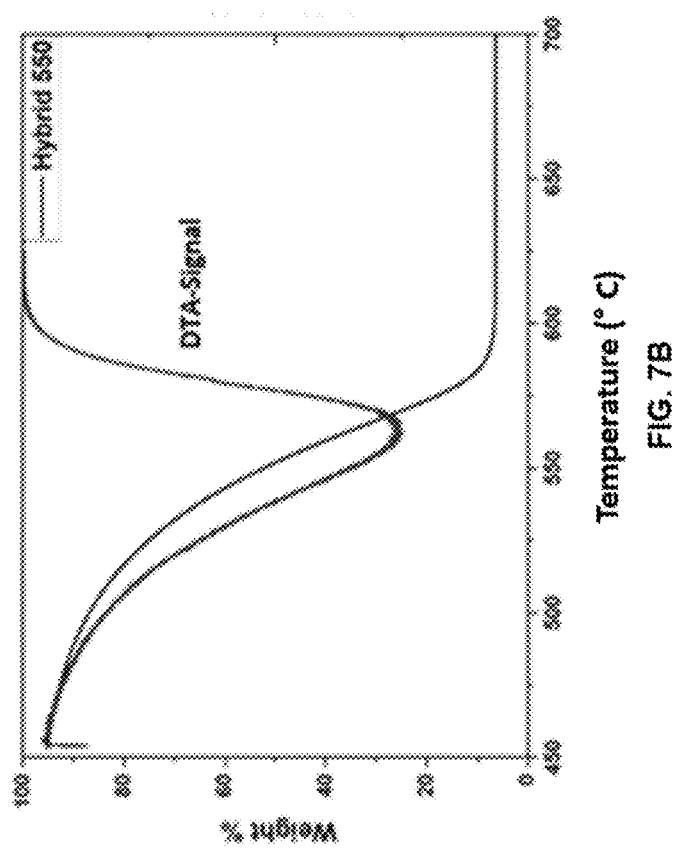
FIGS. 7A-7F show representative data for oxidative TGA weight loss and rate of weight change for standards in order to characterize the carbon produced as further discussed in the Examples.
Figure 7A:
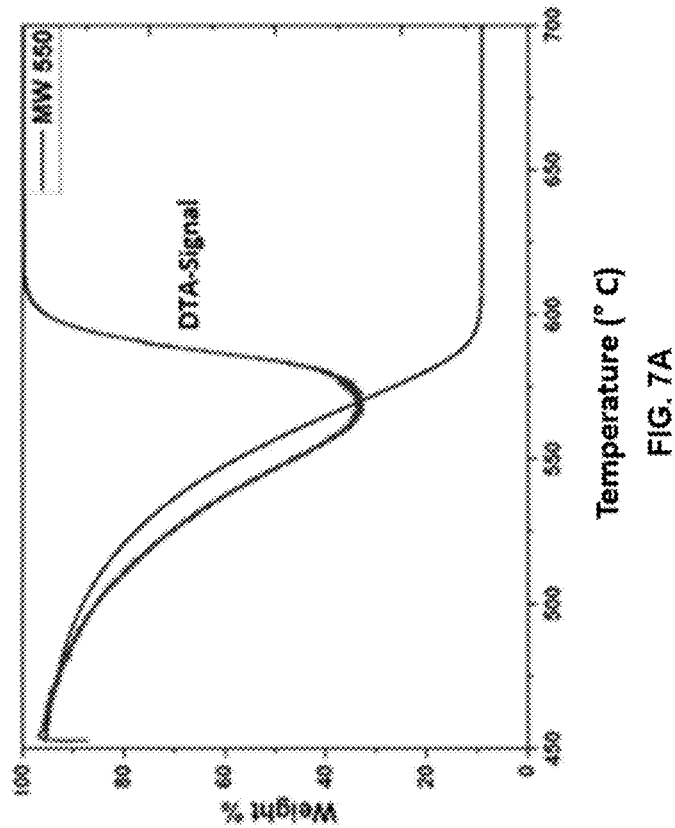
Figure 7D:
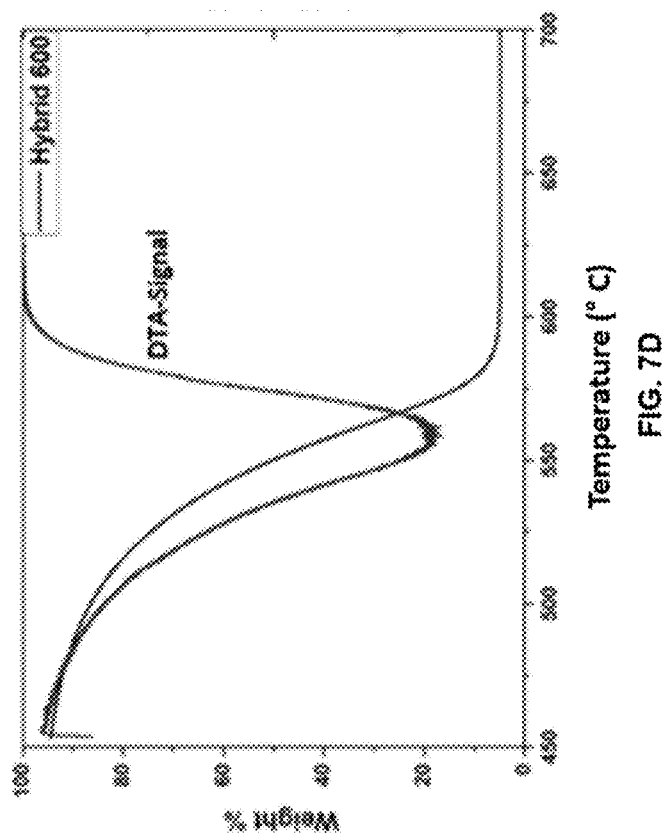
Figure 7C:
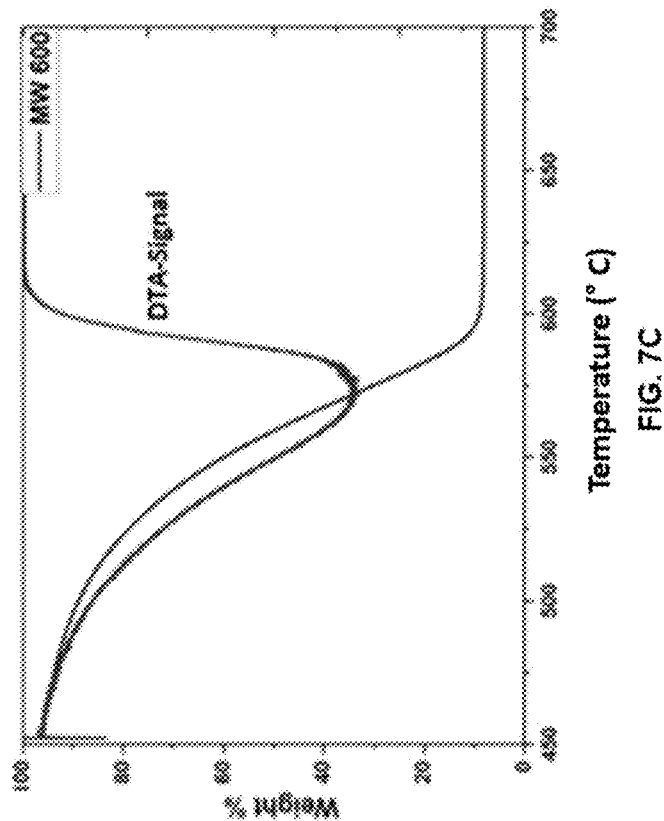
Figure 7F:
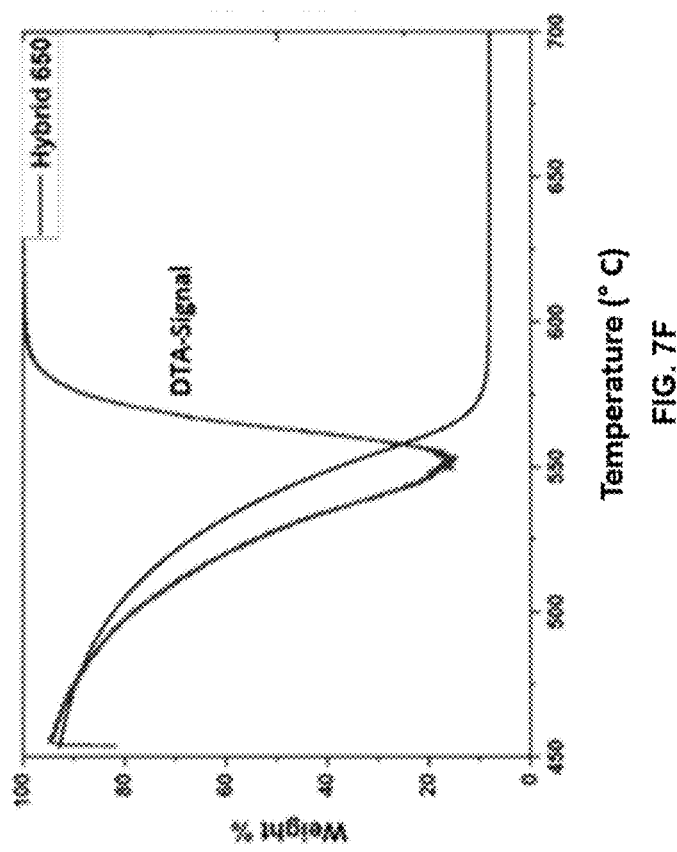
Figure 7E:
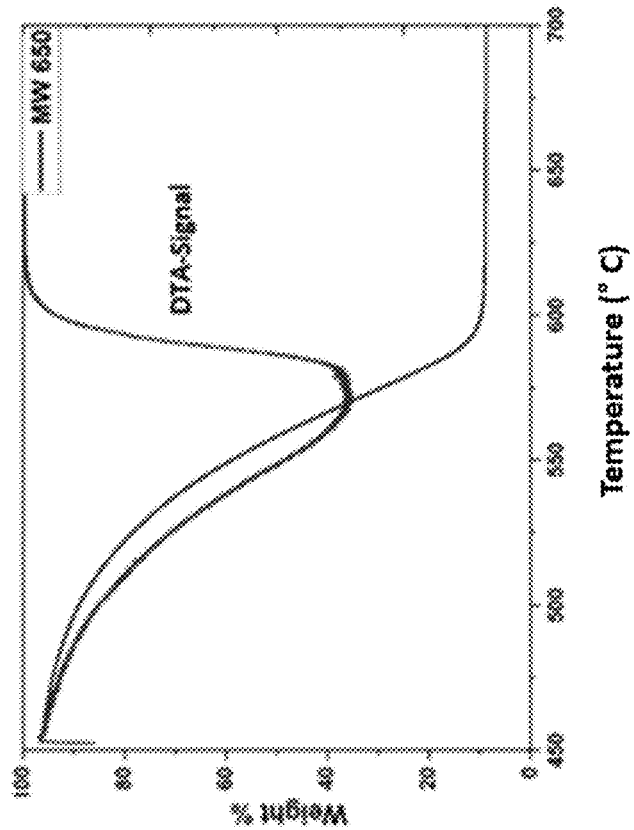
Figure 8:
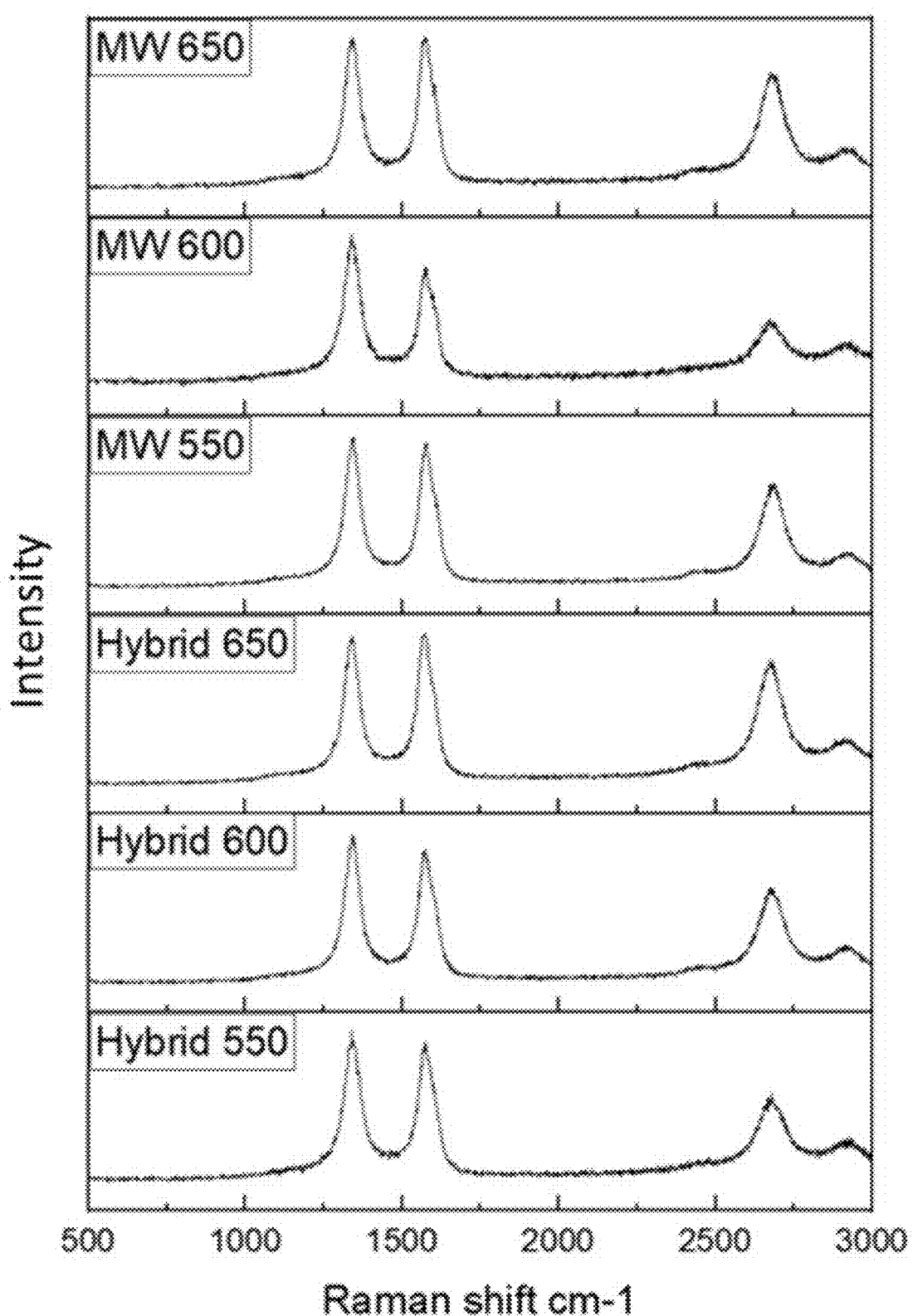
FIG. 8 shows representative Raman spectra of the reacted catalysts under hybrid and microwave heating modes. In the figure panels, the abbreviation insets denote the following: "MW 650" indicates that the heating was carried out using microwave heating with the catalyst bed temperature at 650° C.; "MW 600" indicates that the heating was carried out using microwave heating with the catalyst bed temperature at 600° C.; "MW 550" indicates that the heating was carried out using microwave heating with the catalyst bed temperature at 550° C.; "Hybrid 650" indicates that the heating was carried out using a disclosed hybrid heating process with the catalyst bed temperature at 650° C.; "Hybrid 600" indicates that the heating was carried out using a disclosed hybrid heating process with the catalyst bed temperature at 600° C.; and "Hybrid 550" indicates that the heating was carried out using a disclosed hybrid heating process with the catalyst bed temperature at 550° C. The catalyst bed temperature was monitored using a short-wave infrared Micro-Epsilon pyrometer (Micro-Epsilon USA, Raleigh, North Carolina).

Thermogravimetric Analysis. The type of carbon produced was further characterized by thermogravimetric analysis in air, as seen in FIGS. 6A-6C. The reacted hybrid sample was compared against the prepared carbon standard. Amorphous and crystalline carbon can be readily distinguished by oxidative thermogravimetric analysis (Ref. 24). The peaks of the 1st derivative show the oxidation of different phases of carbon. The less ordered amorphous carbon is typically oxidized at lower temperatures than the CNTs. In FIGS. 7A-7F, the data show that the microwave and the hybrid heating modes both produce carbon that is consistent with the fresh CNTs oxidation temperature, as seen in FIG. 6B. The microwave and the hybrid spent samples both lack the TGA weight loss within the amorphous carbon temperature range. The appearance of only one 1st derivative and the higher weight retention at 450° C. indicates the carbon formed was of a higher order for the microwave and hybrid heating modes. The hybrid heating mode was observed to influence on the morphology of the coke produced as compared to the microwave-only heated sample upon closer inspection of the DTA signal. The microwave-heated sample produced a slightly broader DTA signal skewed towards higher oxidation temperatures than compared to the hybrid heating mode. This shift to higher temperatures suggests that the microwave-heated samples could have produced carbon that is more ordered in structure (multiwalled CNTS and Fibrous CNTs) or carbon of graphitic nature. This suggests that hybrid heating can affect the morphology of the CNTs and improve the uniformity of the produced carbon.

Raman IR Analysis. The Raman spectra were collected to clarify the type of crystalline carbon that was formed on the sample during the reaction. The prominent peaks at 1350 and 1600 $cm^{-1}$ and 2700 $cm^{-1}$ indicate the presence of multi-walled carbon nanotubes (MWCNT). The small peak at 2450 $cm^{-1}$ indicates no substantial graphite in the sample as no characteristic "hump" is centered on 2500 cm−1 (Ref. 25). As seen in FIG. 7, the TGA results and the obtained Raman spectra confirm that the produced carbon is composed of primarily MWCNTs and not graphitic carbon.

Figures 9A, 9B:
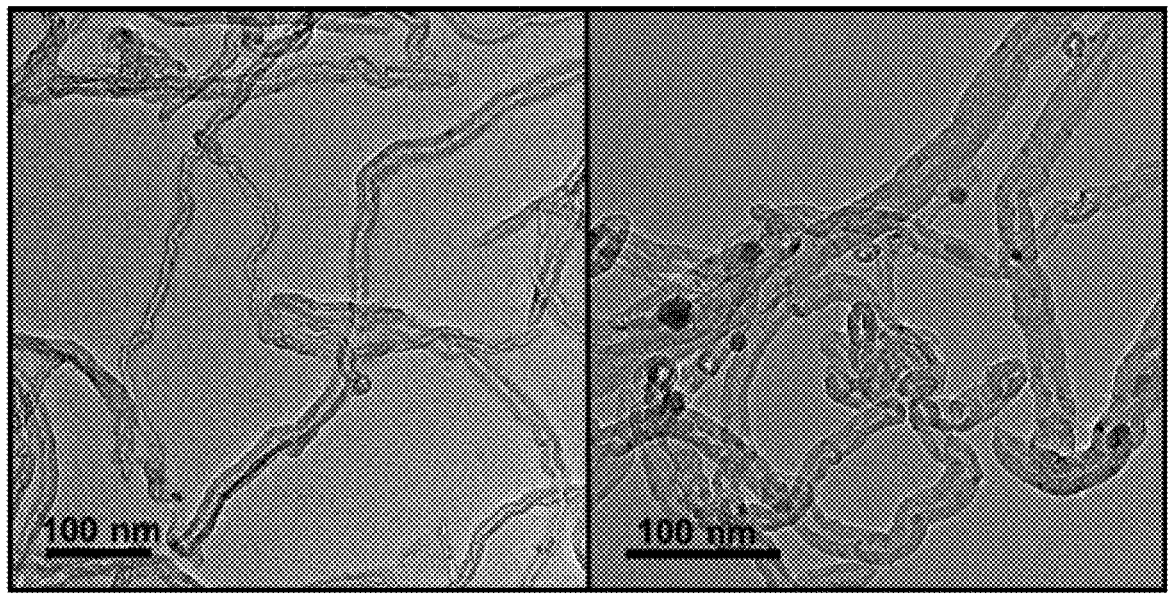
FIGS. 9A-9D show representative TEM images of various samples.
Figures 9C, 9D:
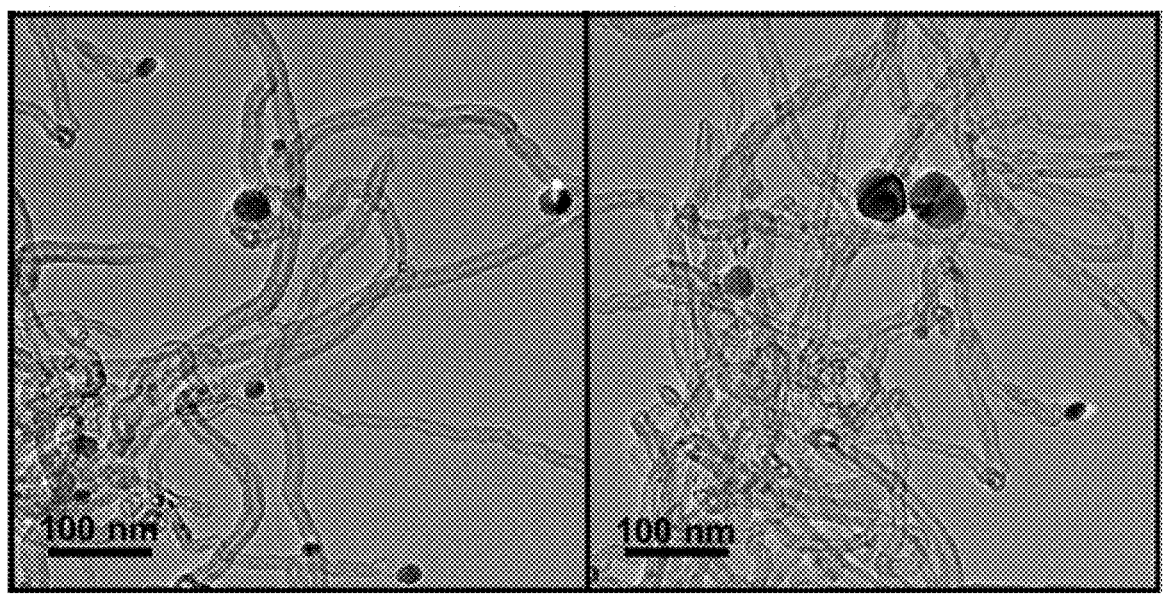
Figure 10:
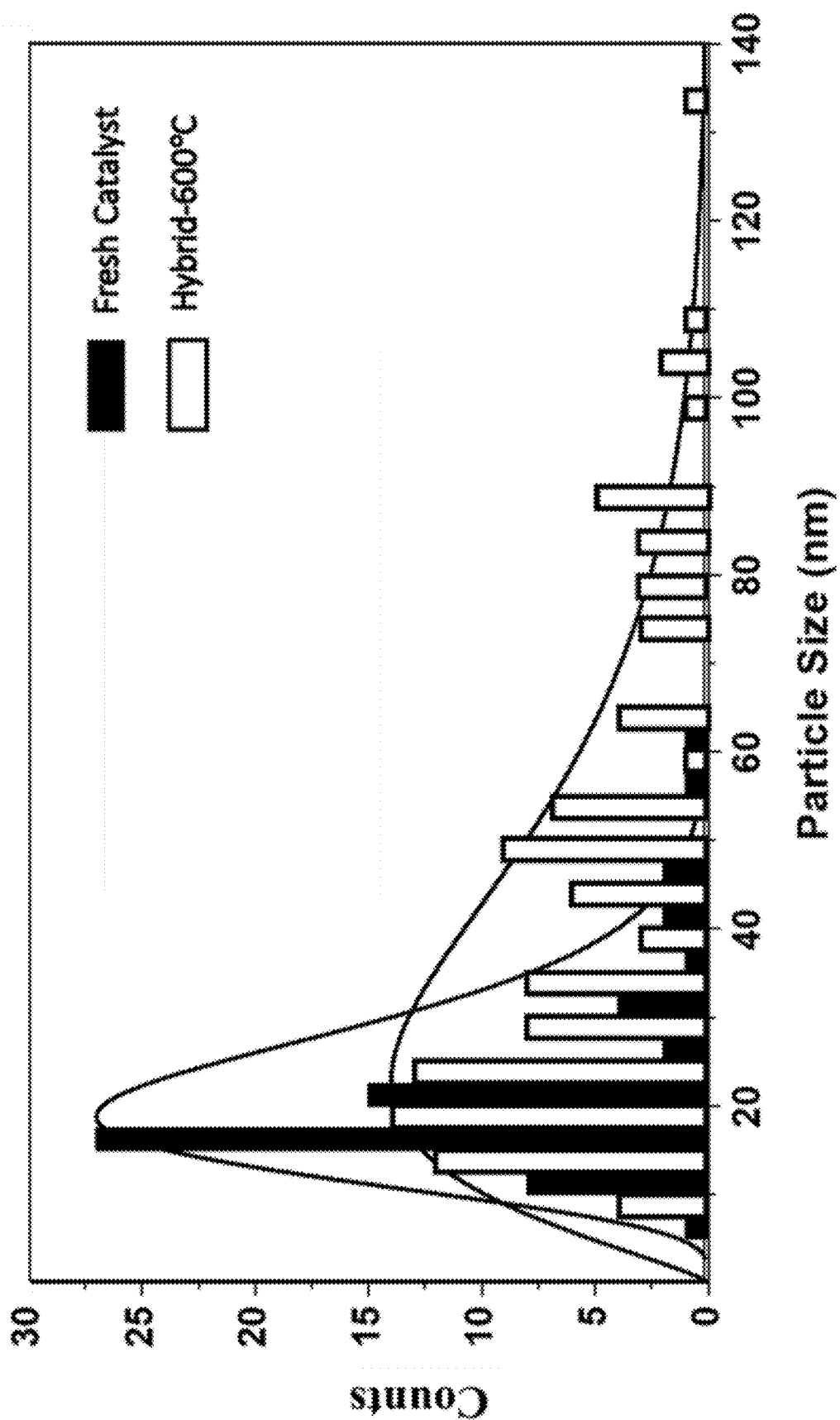
FIG. 10 shows representative histogram data of metal nanoparticle size distribution in the fresh catalyst and after heating in a disclosed hybrid heating method at 600° C.
Figure 11:
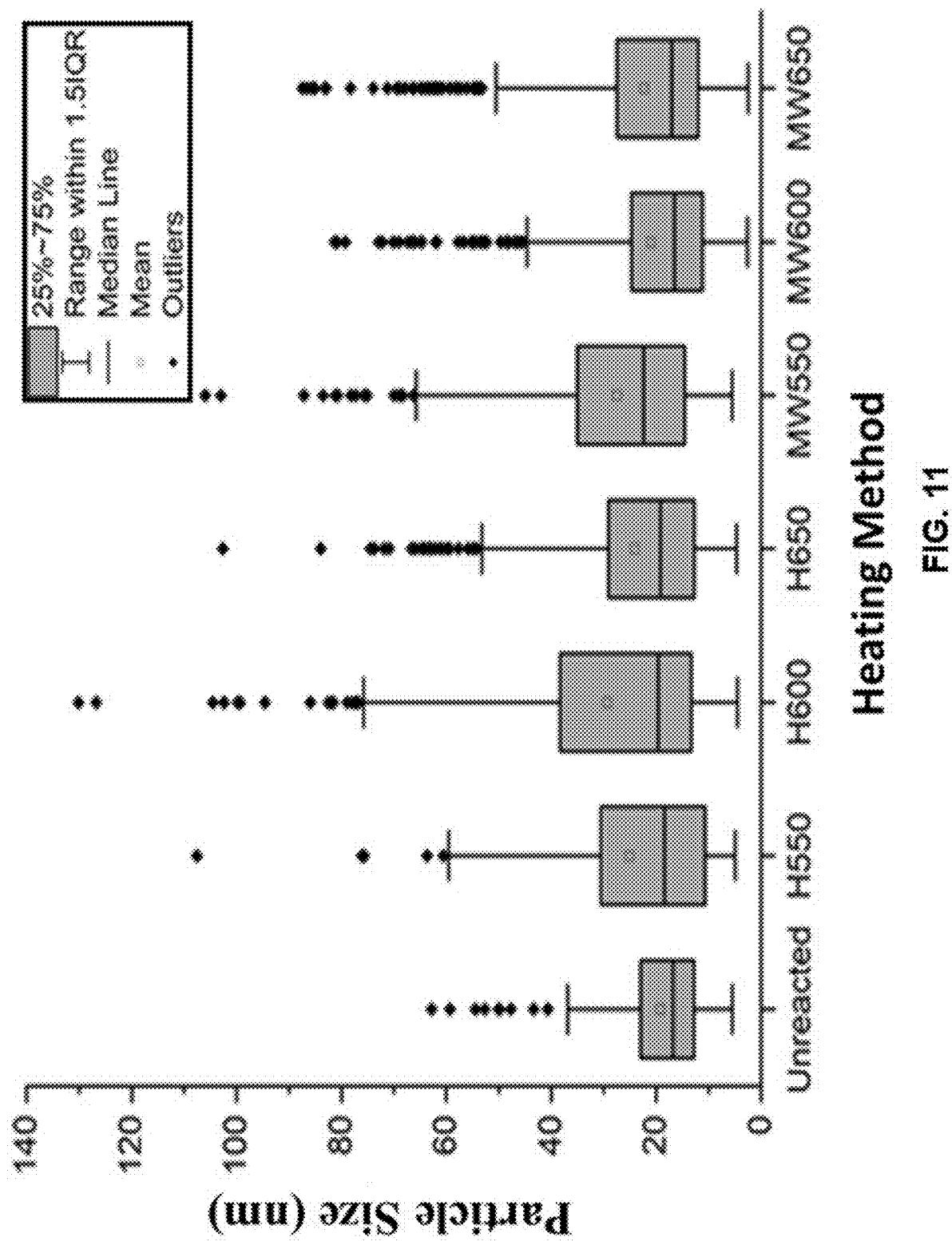
FIG. 11 shows representative particle size distribution data n the fresh catalyst and after heating in a disclosed hybrid heating method at the indicated temperatures.

Carbon and Particle Morphology. TEM images of the bare CNTs and the as-prepared Ni—Pd/CNT catalyst with attached metal particles of different sizes are shown in FIGS. 8A-8D. Metal particle size has been shown to influence the morphology and selectivity of the produced carbon significantly (Ref. 25) It was found that smaller than 10 nm particles resulted in quick deactivation due to graphite encapsulation. In contrast, larger particles reduce the number of active metal sites by weight and generate less ordered structures. FIG. 9 shows the fresh catalyst particle size distribution; the fresh catalyst was found to have an average particle size distribution centered around 20 nm in diameter. The hybrid-600° C. catalyst is also shown in FIG. 9, where the average particle size distribution shifted towards larger particles. It was found that the nanoparticles increased in size during the reaction compared to the unreacted catalyst. The hybrid and microwave-only modes produced a similar particle size distribution, as shown in FIG. 10. Nanoparticle enlargement is a likely source of deactivation and may affect the morphology and size of the produced CNTs.

Identifying the growth method was obfuscated by the similarity of the support and the grown carbon. Still, through careful examination and knowledge of the as-synthesized attachment positions of the nanoparticles, identification of the grown CNTs was elucidated.

TEM Images of the reacted catalysts are shown in FIGS. 11A-11F for the hybrid and FIGS. 12A-12C for the MW reacted catalysts. The frequent occurrence of nanoparticles with CNT growth still attached to the sides of the supporting CNTs indicates that tip-growth was the primary mode of carbon growth during the reaction (Ref. 26). Evidence for this is the frequent occurrence of branching CNT growth on the supporting CNTs, as might be expected from tip growth. Another possibility is that due to the weak strength of the nanoparticles' attachment to the supporting CNTs, physical stresses may have sheared off the nanoparticles from the support, obscuring base growth. The observed nanoparticles were still attached to the supporting CNTs and did not have substantial carbon growth. Also, no CNTs outside the specified size range of the support were found without nanoparticles attached at the tip. It may be possible to utilize an acid-wash catalyst separation process as previously described (Ref. 13). In that case, the successive CNTs growing from the surface of the CNTs could result in tangled and interwoven meshes of CNTs that may have beneficial applications in composite materials as a nanoaggregate or as reinforcement.

Discussion. The effect of microwave radiation on thermal methane catalytic pyrolysis was tested over a CNT-Supported Ni—Pd catalyst. The catalytic activity and carbon produced were evaluated under microwave and hybrid heating at 550° C., 600° C., and 650° C. temperatures. The hybrid heating was found to have a higher methane conversion than the microwave heating alone. The higher conversion was attributed to more efficient catalyst bed utilization and temperature uniformity, as indicated by the thermal imaging results. The power required to maintain the reaction temperature was reduced in the hybrid heating mode by over 60% of what was initially needed under microwave heating only. This work demonstrates the potential of utilizing industrial waste heat to lower the microwave reactor's overall required generator size, catalyst costs, and input energy requirements, thus reducing a microwave reactors system's overall capital cost and energy requirements.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method for producing hydrogen and crystalline carbon materials from methane, the method comprising:
   a. conveying a process gas comprising methane to a chemical reactor; wherein the reactor comprises a catalyst material comprising Ni—Pd, Ni—Cu, Co, Fe, or a combination thereof and a catalyst support comprising a solid carbon material;
   b. heating the catalyst with a thermal fluid and microwave irradiation using a hybrid heating device;
   c. contacting the catalyst with the process gas; wherein the methane undergoes pyrolysis, thereby forming hydrogen and at least one solid carbon product; and
   d. collecting the hydrogen;
   wherein hybrid heating device comprises:
   a process gas reactor;
      wherein the process gas reactor has a thermally heated reactor surface;
      wherein the thermally heated reactor surface is in contact with a catalyst bed within the process gas reactor;
   a heating system comprising a thermal fluid heating system and a microwave heating system;
      wherein the thermal fluid heating system comprises a thermal fluid inlet for conveying the thermal fluid to the thermal fluid heating system and a thermal fluid outlet for conveying the thermal fluid from the thermal fluid heating system;
      wherein the thermal fluid heating system transfers heat to the thermally heated reactor surface;
      wherein the microwave heating system comprises a microwave generator and a microwave tuner;
      wherein the microwave generator is positioned to irradiate the catalyst bed;
   a process gas inlet for conveying a process gas to the process gas reactor;
      wherein the process gas is conveyed to be in contact with the catalyst bed;
   a process gas outlet for conveying unreacted process gas and reactant gas out from the process gas reactor.

2. The method of claim 1, further comprising recycling the catalyst:
   e. refluxing the catalyst with an acid composition;
   f. using a portion of the at least one solid carbon product as a catalyst support to restart the method at step (a).

3. The method of claim 2, where the solid carbon material is a carbon nanomaterial.

4. The method of claim 3, wherein the carbon nanomaterial is selected from nanoparticles, fullerenes, carbon filaments, single-walled carbon nanotubes, multi-walled carbon nanotubes, carbon nanofibers, or a combination thereof.

5. The method of claim 4, wherein the carbon nanomaterial is a carbon nanotube material, a carbon fiber, a carbon nanofiber, or combinations thereof.

6. The method of claim 2, wherein a portion of the at least one solid carbon product is removed from the acid solution.

7. The method of claim 1, wherein the thermal fluid has a temperature from about 150° C. to about 500° C.

8. The method of claim 1, wherein the microwave irradiation heats the catalyst to a temperature from about 500° C. to about 850° C.

9. The method of claim 1, further comprising step (h) using a portion of the at least one solid carbon product as a supporting solid carbon product to restart the method beginning at step (a).

10. The method of claim 9, wherein from about 5 wt % to about 90 wt % of the solid carbon product is used to restart the method at step (a).

11. The method of claim 1, wherein the microwave radiation is applied at a power from about 20 W to about 10 MW.

12. The method of claim 1, wherein the microwave radiation has a frequency from about 915 MHz to about 20 GHz.

13. The method of claim 1, wherein the thermal fluid has a pressure from about 0.1 bar to about 2000 bar.

14. The method of claim 1, wherein the thermal fluid heating system comprises a thermal jacket disposed around the process gas reactor.

15. The method of claim 1, wherein the process gas reactor comprises a tube disposed within the thermal jacket; and wherein the thermal jacket is a tube surrounding the process gas reactor.

16. The method of claim 1, wherein the at least one solid carbon product comprises a crystalline carbon material.

17. The method of claim 16, wherein the crystalline carbon material comprises a nanostructured carbon material.

18. A composition comprising at least one solid carbon product made by the method of claim 1.

* * * * *